(12) United States Patent
Fox

(10) Patent No.: US 7,767,259 B2
(45) Date of Patent: Aug. 3, 2010

(54) METHODS OF MANUFACTURING HOT MIX ON SITE UTILIZING A COMPOSITION OF PELLETS OF TACKY, DEFORMABLE MATERIAL DISPERSED WITHIN A FLOWABLE FINE MATERIAL

(75) Inventor: Steve A. Fox, South Pomfret, VT (US)

(73) Assignee: NiTech Corporation, South Pomfret, VT (US)

( * ) Notice: Subject to any disclaimer, the term of this patent is extended or adjusted under 35 U.S.C. 154(b) by 9 days.

(21) Appl. No.: 12/150,120

(22) Filed: Apr. 24, 2008

(65) Prior Publication Data

US 2008/0224345 A1 Sep. 18, 2008

Related U.S. Application Data

(63) Continuation-in-part of application No. 11/474,923, filed on Jun. 26, 2006.

(60) Provisional application No. 60/693,873, filed on Jun. 24, 2005, provisional application No. 60/925,966, filed on Apr. 24, 2007.

(51) Int. Cl.
  *B05D 7/00* (2006.01)
(52) U.S. Cl. .................. 427/212; 427/136; 427/138; 404/75; 404/92
(58) Field of Classification Search .................. 427/136, 427/212, 138; 404/75, 92
  See application file for complete search history.

(56) References Cited

U.S. PATENT DOCUMENTS 1,354,076 A * 9/1920 Stephens ...................... 404/92

3,026,568 A 3/1962 Moar
3,196,487 A 7/1965 Snelling (Continued)

FOREIGN PATENT DOCUMENTS

JP 52087829 * 7/1977

OTHER PUBLICATIONS

BusinessKnowledgeSource.com, Continuous Production, Manufacturing Info Website, Web: http://www.businessknowledgesource.com/manufacturing/continuous_production_028688.html, Sep. 22, 2009.*

(Continued)

*Primary Examiner*—Michael Cleveland
*Assistant Examiner*—Tabatha Penny
(74) *Attorney, Agent, or Firm*—Jenkins, Wilson, Taylor & Hunt, P.A.

(57) ABSTRACT

Methods of manufacturing hot mix on site utilizing a composition of discrete substances that are capable of being mixed together to form a composite material are disclosed. The composition includes a plurality of pellets of a tacky, deformable material at an ambient temperature dispersed within a flowable fine material. Stone aggregate is placed in a mixing chamber that has been moved within proximity of the location where the hot mix is to be used. At least a portion of the stone aggregate is heated in the mixing chamber to a temperature sufficient to soften the pellets of the tacky, deformable material. The composition of discrete substances is added into the mixing chamber. The mixture of the composition of discrete substances and the stone aggregate is agitated until the pellets of a tacky, deformable material soften and uniformly coat the stone aggregate.

29 Claims, 17 Drawing Sheets

U.S. PATENT DOCUMENTS

| | | | |
|---|---|---|---|
| 3,632,418 A * | 1/1972 | Draper | 428/219 |
| 3,783,000 A | 1/1974 | Takase et al. | |
| 3,905,587 A * | 9/1975 | Preeman | 366/25 |
| 3,965,281 A | 6/1976 | Takase et al. | |
| 4,728,276 A | 3/1988 | Pauley et al. | |
| 4,769,288 A | 9/1988 | Saylak | |
| 4,784,216 A * | 11/1988 | Bracegirdle et al. | 165/64 |
| 4,859,502 A * | 8/1989 | Astrope et al. | 427/139 |
| 5,254,385 A | 10/1993 | Hazlett | |
| 5,290,833 A | 3/1994 | Schmanski | |
| 5,414,197 A | 5/1995 | Wakeley et al. | |
| 5,637,350 A * | 6/1997 | Ross | 427/212 |
| 5,688,449 A | 11/1997 | Fox | |
| 6,120,899 A | 9/2000 | Cameron et al. | |
| 6,238,732 B1 | 5/2001 | Cameron et al. | |
| 6,440,205 B1 | 8/2002 | Bailey et al. | |
| 6,824,600 B2 | 11/2004 | Bailey et al. | |
| 6,863,724 B2 | 3/2005 | Bailey et al. | |
| 2003/0070579 A1 * | 4/2003 | Hong et al. | 106/31.04 |

OTHER PUBLICATIONS

Indiana Department of Transportation, Certified Hot Mix Asphalt Technician Manual, p. 4-22, Web: http://www.in.gov/indot/3434.htm, Sep. 24, 2009.*

Nichireki Ch Ind KK, Pavement composition which does not require use of heat consist of cement aggregate and asphalt emulsion, JP 52087829, Jul. 22, 1977, Derwent Abstract.*

"Hot Mix Asphalt Materials, Mixture Design and Construction", NCAT, pp. 417-419 (1991).

Restriction Requirement dated Jan. 8, 2009, for U.S. Appl. No. 11/474,923.

Non-Final Office Action dated May 7, 2009, for U.S. Appl. No. 11/474,923.

Notice of Allowance from U.S. Appl. No. 11/474,923 dated Nov. 20, 2009.

* cited by examiner

METHODS OF MANUFACTURING HOT MIX ON SITE UTILIZING A COMPOSITION OF PELLETS OF TACKY, DEFORMABLE MATERIAL DISPERSED WITHIN A FLOWABLE FINE MATERIAL

RELATED APPLICATIONS

The current application is a continuation-in-part patent application which claims the benefit of the filing date of U.S. patent application Ser. No. 11/474,923, filed Jun. 26, 2006, the disclosure of which is incorporated herein by reference in its entirety. U.S. patent application Ser. No. 11/474,923 claims priority to U.S. Provisional Patent Application Ser. No. 60/693,873, filed Jun. 24, 2005, the disclosure of which is also incorporated herein by reference in its entirety. The current application also claims priority to U.S. Provisional Patent Application Ser. No. 60/925,966, filed Apr. 24, 2007, the disclosure of which is incorporated herein by reference in its entirety.

TECHNICAL FIELD

The subject matter relates, in general, to compositions of tacky material disposed within a fine material and methods of making such compositions. More particularly, the invention relates to methods of manufacturing polymeric or asphaltic hot mix at the location of dispensing from a final formula of composite materials, such as asphaltic mixtures, that includes aggregate and a composition of a plurality of pellets of tacky, deformable material, such as asphalt, dispersed within fine material, such as powder or fibers, used in a manner that allows the composition to be flowable, transportable, and stable.

BACKGROUND

Hot mix asphalt (hereinafter "HMA") or stone matrix asphalt (hereinafter "SMA") is commonly used in highway construction for paving both in new road construction and in maintenance of existing roads which have surface cracks or potholes. Similarly, HMA and SMA mixes are used in airfield construction for paving both new runways and in maintenance of existing runways. These HMA and SMA mixes are currently produced in stationary plants utilizing liquid asphalt stored at temperature above the melting point typically above 230° to 250° F. This liquid asphalt is then pumped into a gradation of heated stone aggregated which has a specific particle size distribution properly suited for the paving or repair application. Different gradations are used for different applications, usually ranging in particle size from material passing 200 mesh (0.003 inch) to 0.75 or 1 inch diameter. About 5% to 7% by weight asphalt is mixed with the aggregate to produce HMA or SMA. Plastic asphalt utilizing polymers as binders for the aggregate have also been used.

The creation and use of HMA and SMA mixes can be challenging, since both the HMA and SMA mixes and the asphalt used in the HMA and SMA mixes require the use of large amounts of energy to be maintained at relatively high temperatures until used. For example, the transport of such asphalt to be used as binder in the various asphaltic mixture applications can be problematic. Typically, asphalt is handled in bulk form due to the fact that the material tends to stick together even after separation when stored in the same container. During processing in anticipation for use, the asphalt must be kept heated at over 275° F. in liquid form for subsequent handling and mixing. For example, asphalt binder is handled as a hot liquid from its origination point, usually the refinery, with heated rail cars or trucks. The asphalt binder remains heated in its liquefied state through shipment to and use in the asphalt mix plant. Since such material must be maintained at elevated temperatures for transfer to storage tanks and any transfer from one container to another until ultimate use, significant amounts of energy in the form of heat must be expended in order to maintain the asphalt in its liquefied state. It is estimated that, in the United States alone, over 60 billion pounds of asphalt must be kept continuously heated. Depending on any additives or other materials added to the asphalt, maintaining the asphalt at elevated temperatures for prolonged periods can adversely affect the properties of the asphalt.

Similarly, problems arise in the transport of the HMA and SMA mixes. To pave roads which may be 30 or 50 miles or more from the mix plant, very careful and difficult coordination is required between the production of the hot HMA and SMA mixes at the plant, the use of large trucks with consequent traffic control, the need to maintain the HMA and SMA mixes at a controlled temperature to the jobsite, and the coordination of the paving crew and equipment for proper installation of the HMA and SMA mixes for paving and patching roads, bridge decks, parking lots, airport runways, and other paving jobs. Proper temperature of the HMA and SMA mixes when applied is important and difficult to control due to hauling long distance and often presents problems.

Situations which present particular difficulty using these fixed plant trucking systems are maintenance, patching, and off-season work. For example, remote airfields may become damaged thus rendering them unusable. Also roads may be damaged in remote locations creating situations involving high security and safety risk where quick local action is required. Often maintenance or pothole patching may only require a few tons of HMA or SMA at a remote location. To send a truck with three to five tons of HMA from a mix plant may take several hours of expensive labor and equipment and often excess material is dumped on vacant land, creating an environmental hazard to be resolved later. The conventional system is expensive and inefficient for use for small amounts of maintenance, patching, and off-season work, especially in remote areas.

One alternative to hot mix patching is an emulsified asphalt mix applied at ambient temperature with solvents and water evaporation after placement. These "cold" mix systems are inferior in quality and often must be replaced. Also, they can be very expensive.

Another alternative uses small, portable mix units, typically 5 to 15 tons/hr, to heat recycled asphalt (hereinafter "RAP") for patching. These units do not produce HMA or SMA of adequate quality to meet pavement grade specifications. These units normally use open flame to heat the mix which has previously been coated with binder. This open flame can degrade the RAP mix which already has the binder coating. In order to reheat the RAP mix, the aggregate which has already been coated with asphalt or polymer binders requires a large amount of heat to get the aggregate to a working temperature of 300° F. to 350° F. Such a temperature will burn or thermally degrade the asphalt or polymer coating creating a substandard product which will not meet the standards or specifications of most state departments of transportation or specifications for new hot mix. Also, large amounts of smoke and unhealthy gases and smells are produced.

Another method used for winter repair is the "hot box" manufactured by companies like RayTek of Charlestown, N.H. These devices use indirect heat, such as gas fired plates, which conduct the heat in a chamber to reheat stock piles of previously coated aggregate. The advantage of these devices is they do not use open direct flame which would burn and degrade the binder coated aggregate. However, they keep the coated aggregate at high temperatures sometimes for days while they are transported to job sites for small patching jobs. Such long periods of high temperatures also degrade the asphalt binder to a substandard product. Further, hot mix used in these devices requires continuous heating using much energy and only supply limited quantities of mix. If the total amount is not used, reheating further degrades the mix.

Thus, a need exists for an on site hot mix system that can solve such difficult problems and facilitate quick repair with materials that can be stored on site at ambient temperature.

SUMMARY

In accordance with this disclosure, methods of manufacturing hot mix at a location of use utilizing a composition of pellets of tacky, deformable material dispersed within a flowable fine material are provided. It is, therefore, an object of the present disclosure to provide a method of making hot mix at a location of use that includes moving a mixing chamber within proximity of the location where the hot mix is to be used. A composition is provided of discrete substances that are capable of being mixed together to form a composite material upon proper heating. The composition includes a plurality of pellets of a tacky, deformable material dispersed within a flowable fine material such that the fine material occupies the interstices between the plurality of pellets in a manner that minimizes pellet to pellet contact. A stone aggregate based on a gradation to be used in the hot mix is provided. The stone aggregate is placed in the mixing chamber and at least a portion of the stone aggregate gradation is heated in the mixing chamber to a temperature sufficient to soften the pellets of a tacky, deformable material. The composition of discrete substances is added into the mixing chamber. The mixture of the composition of discrete substances and the stone aggregate is agitated until the pellets of the tacky, deformable material soften and uniformly coat the stone aggregate and fine material.

An object of the presently disclosed subject matter has been stated hereinabove and can be achieved in whole or in part by the presently disclosed subject matter. Other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill of the art is set forth more particularly in the remainder of the specification, including reference to the accompanying figures in which.

DETAILED DESCRIPTION

Figure 1:
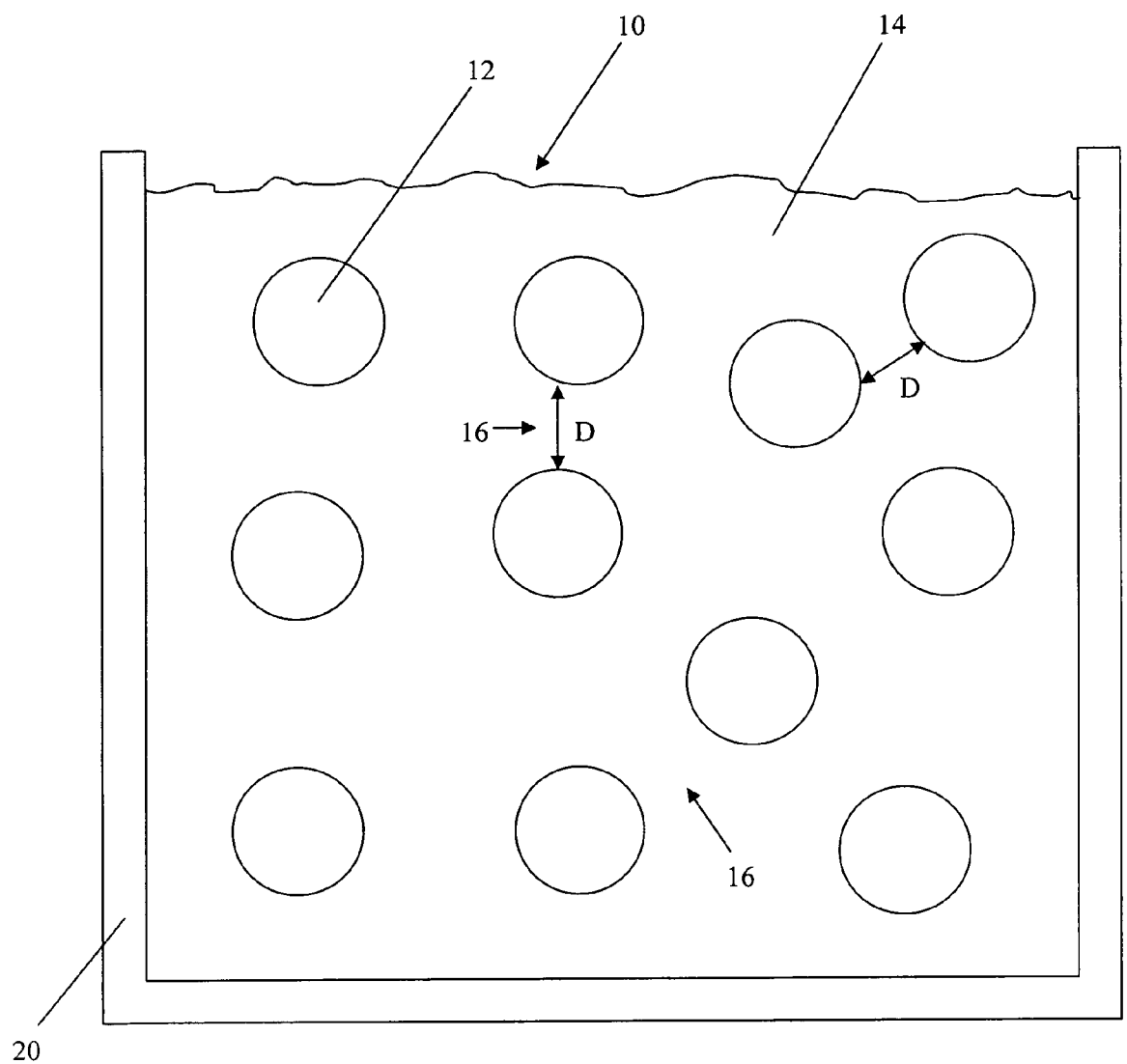
FIG. 1 illustrates a cross-sectional schematic view of a container containing an embodiment of a composition having pellets of a tacky deformal material dispersed within fine material.

Reference will now be made in detail to presently preferred embodiments of the invention, one or more examples of which are shown in the figures. Each example is provided to explain the subject matter and not as a limitation of the invention. In fact, features illustrated or described as part as one embodiment can be used in another embodiment to yield still a further embodiment. It is intended that the present invention cover such modifications and variations.

As used herein, "hot mix" means any mixture of binder material and an aggregate gradation that when heated forms a composite material that hardens when cooled. "Hot mix" can include but is not limited to HMA, SMA, warm mix asphalt ("WMA"), asphaltic mixtures, mixtures containing polymeric resins and the like.

As used herein, "aggregate" or "aggregate gradation" means the different sized fine material and stones used within a hot mix.

As used herein, "stone aggregate" means the portion of the aggregate gradation that comprises different sized stones and possibly larger fine material.

A method is provided for a two-component process which, when heated and mixed on site at the desired location where the mixture is to be applied, produces an accurate, high quality hot mix for each specific mix design.

By taking the required aggregate gradation of a hot mix and putting a portion of the fine material in with pellets of a binder material, which is tacky and deformable at ambient temperatures in a composition described below, both the composition and the coarse portion of the gradation can be shipped separately to the site where the final mix will be applied in a measured amount.

When the mixture is to be created for a specific use a measured amount of the coarse aggregate portion, or stone aggregate can be placed in a mixer and heated to a temperature above the softening point of the pelletized binder material, such as asphalt or polymer. Such a temperature can be about 300° F. to about 450° F. Since only stone aggregate is heated, the heating can be done efficiently by a direct heating source, since there is no asphalt or polymer in contact with the direct heating source. The heating source can be a direct flame. Once the stone aggregate is heated, the heat source can be turned off and the proper ratio of composition of fine material and pellets of binder material are added to the stone aggregate in a rotating mixer. The hot stone aggregate conducts heat to the composition including the pellets of binder material to produce a uniformly coated high quality hot mix in a few minutes. Since the latent heat from the stone aggregate transfers to the binder pellets to soften them, the binder material never overheats. This minimizes smoke, fumes, and binder degradation. The mixer can be applied to patching, potholes, repairing pavements, making curbing or walkways, and the like. The mix is then ready to be instantly placed and compacted in the appropriate shape. Once cooled, the created structure is ready for immediate use.

A key advantage of this system is the composition and using pellets of binder material that are small and uniform and disperse readily into the hot aggregate for easy melting and coating. FIG. 1 illustrates a composition, generally designated as 10, made of discrete substances that are capable of being mixed together to form a composite material. The composition 10 includes pellets 12 of a material, which is tacky and deformable at ambient temperatures. As used herein, ambient temperatures are between about 60° F. to about 100° F. The composition further includes a fine material 14 that surrounds the pellets of tacky, deformable material effectively separating pellets 12 of the tacky, deformable material from each other.

Fine material 14 comprise loosely held granular, flake, or fiber particles which are not tacky and have a low coefficient of friction between each other to allow the particles to easily slide over one another. In this manner, fine material 14 is effectively flowable such that fine material 14 exhibits similar properties to a liquid. For example, fine material 14 may be pourable. Such a fine material 14 will tend to migrate and occupy void areas when fine material 14 is placed into a container.

Pellets 12 of the tacky, deformable material are spaced apart within fine material 14 at distances D that create interstices, generally designated as 16, between pellets 12 of the tacky, deformable material. Fine material 14 surrounds each pellet 12 and fully occupies interstices 16 between pellets 12. Preferably, the distances D between pellets 12 should create interstices 16 that minimize pellets 12 of the tacky, deformable material from contacting one another, thereby preventing the tacky material from coagulating into large clumps. By having fine material 14 occupying the interstices 16 at such distances D, pellets 12 may flow within fine material 14. In this manner, composition 10 of pellets 12 of tacky, deformable material and fine material 14 may be contained in a container 20 that allows composition 10 to be poured from container 20 in incremental amounts. Thereby, small batches of composition 10 may be mixed together alone under heat, or with other substances, to create a composite material having different properties than that of composition 10 with its discrete pellets 12 and fine material 14.

The tacky, deformable material from which pellets 12 are made may be a polymeric resin, which may include homopolymers, copolymers such as, for example, block, graph, random and alternating copolymers, terpolymers, etc., and blends and modifications thereof. For instance, polymeric resins may include ethylene propylene diene monomers ("EPDM"), vinyl acetate polymers, polyurethanes, polyacrylics, or combinations thereof that are tacky and deformable at ambient temperatures. The polymer resins can also include polyethylene, polypropylene, thermoplastic rubber, poly-vinyl chloride, nylon, acrylic, and polystyrene. The tacky, deformable material may also be a hot melt adhesive as disclosed in U.S. Pat. No. 6,120,899, which is incorporated herein by reference in its entirety. Additionally, the tacky, deformable material can be a one or two part epoxy powder. Further, styrene-butadiene-styrene ("SBS") polymers or styrene-butadiene-rubber ("SBR") polymers may comprise the tacky, deformable materials, which form pellets 12.

The polymeric resin used in the composition can be a clear polymer. For example, the clear polymer can be an acrylic or polycarbonate. When such clear polymer is used, the aggregate can be colored for specific use, For example, the stone aggregate can be red, blue, yellow, green, etc. to show through the clear polymer to provide a decorative appearance. The fine material can also be colored.

The clear polymer can be a type of polymer that diffuses light, such as light from a light source. By diffusing light, the mixture can be used to better identify walkways, airfields, etc. Acrylic or polycarbonate are also useful for such embodiments.

The polymeric resin can crosslink upon heating to produce a nonthermoplastic material. The polymeric resin can be, for example, polyethylene that can be crosslinked with the addition of peroxides and heat activated to initiate the crosslinking. Such crosslinking is standard technology for polyethylene and other polymers and is used to produce different qualities in the polymeric resin. For example, the crosslinked polymeric resins can have higher tensile strength and better UV resistance which can be important properties for roadways, walkways, airfields, etc. Another crosslinkable polymeric resin is epoxy which can be heat activated to crosslink. For example, the epoxy can be a one or two part epoxy powder. All such crosslinkable polymeric resins need to be placed soon after activation and before full crosslinking occurs. Thus, by making the hot mixture at the location where it is to be placed is advantageous for hot mixtures containing crosslinkable polymeric resin.

The tacky, deformable material such as polymeric resins can also include an additive or chemical which will emit light previously absorbed from the sun. Such properties are useful for walkways, airfields, etc. so that such walkways, airfields, etc. stay lighted after dark. For example, glow in the dark additives such as polycrystalline inorganic sulfides can be used in conjunction with clear polymers like polystyrene, polyethylene, acrylics, etc. The additives can be added in the fine material or as part of the tacky deformable material by being mixed with the polymeric resin. Further, the tacky, deformable material can be a polymeric resin that can emit light when powered by an external energy source such as UV or RF energy.

Tacky, deformable material may also include asphalt, which as used herein means any type of asphaltic material. For example, the tacky, deformable material may be bituminous, polymeric asphalt, asphaltum, uinitaite, and uintahite and other hydrocarbon resins used as asphalt or asphalt substitutes. Such material may also include asphalt binder.

These asphalt materials are moldable and tend to stick together at temperature ranges from below 60° F., depending on the material, up to the temperatures at which the materials turn into a more liquid or fluid state. These materials, when formed into small pellets, will tend to coagulate and stick together, if stored together in isolation, making incremental disbursement hard to achieve. When these pellets of material are stored in large amounts by themselves, the pressure of the weight created by the pellets of material upon themselves will not only cause the pellets to coagulate, but also to coalesce forming larger blocks of material. This coalescing especially occurs at points in the storage container where the pressure is high such as towards the bottom.

Fine material 14 should be non-tacky. Fine material 14 may comprise at least one of a powder or fibrous material. For example, fine material 14 may be a powder such as limestone, mineral fines, aggregate fines, hydrated lime, fly ash, sulfur, or ground rubber. The fibers may include such fibers as cellulosic fibers or mineral fibers. Fine material 14 may include any of the powders or fibers listed above or a mixture thereof. The powders used may have a fineness that allows the powders to pass through the sieve designations contained in Table 1, below. For example, the powder may have a fineness that allows the powders to pass through a number 4 sieve, which has openings therein of 0.187 inches. In some embodiments, the powder may have a fineness that allows the powders to pass through a number 20 sieve, which has openings therein of 0.033 inches. In other embodiments, the powders may have a fineness that permit the powders to pass through a number 30 sieve, which has openings of about 0.023 inches. Such fine material creates a solid mixture of non-sticky material that is easily flowable.

When used in asphaltic mixtures, fine material 14 helps to adequately stiffen the asphalt so that the mixture is run resistant and also ensures that drain down of the asphalt within the asphaltic mixture does not occur during construction. Further, besides the powder material that may be added to asphalt to create an asphaltic mixture, as pointed out above, fibers may be added in an asphaltic mixture as stabilizers. There are a number of fiber properties that contribute to the asphlatic mixture including length and thickness. Such properties help prevent drain down within the asphaltic mixture.

Table 1 below illustrates the possible fineness of the powders and fibers, which may be used within composition 10.

TABLE 1

| Sieve Designation | Nominal Sieve Opening | |
|---|---|---|
| | Inches | Millimeters |
| 4 | 0.187 | 4.75 |
| 5 | 0.157 | 4.00 |
| 6 | 0.132 | 3.35 |
| 7 | 0.11 | 2.80 |
| 8 | 0.0937 | 2.36 |
| 10 | 0.0787 | 2.00 |
| 12 | 0.0661 | 1.70 |
| 14 | 0.0555 | 1.40 |
| 16 | 0.0469 | 1.18 |
| 18 | 0.0394 | 1.00 |
| 20 | 0.0331 | 0.85 |
| 25 | 0.0278 | 0.71 |
| 30 | 0.0234 | 0.60 |

Fine material 14 or parts of fine material 14 may comprise different amounts of composition 10 depending on the materials used. For example, if asphalt is the tacky, deformable material, then for 100 parts of asphalt by weight, 1 to 20 parts of fibers by weight may be used. For another example, 1 to 40 parts by weight of hydrated lime may be used for 100 parts of asphalt by weight. In some embodiments, 1 to 50 parts by weight of rubber that has been ground up into fine particles can be used with 100 parts asphalt by weight. In other embodiments, aggregates such as uintaite sold under the trademark GILSONITE by the American Gilsonite Company located in Vernal, Utah, may comprise 10 to 100 parts by weight with 100 parts by weight of asphalt within the mixture.

If a polymeric asphalt material is used as the tacky, deformable material of pellet 12, then styrene-butadiene-rubber or styrene-butadiene-styrene polymers may comprise about 1 percent to about 10 percent of the weight of the polymeric asphalt.

By using such materials in the composition for creating an asphaltic mixture, the composition includes components used within the final formula of the asphaltic mixtures. Thus, the need for the user to have to separately measure out those components contained in the composition is eliminated when making the final asphaltic mixture.

Figure 2:
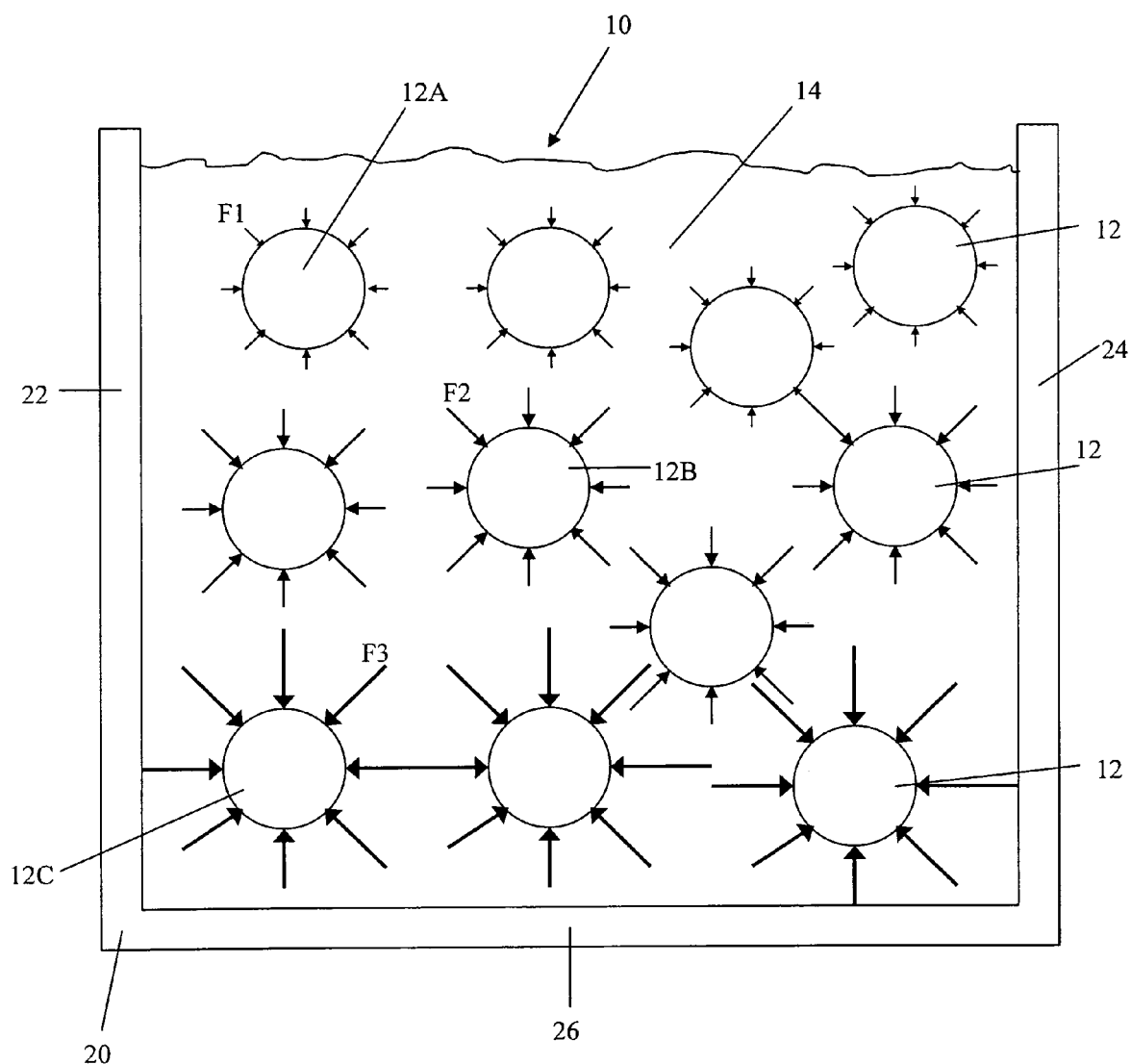
FIG. 2 illustrates a cross-sectional schematic view of a container containing a composition according to FIG. 1 furthering illustrating pressure distribution about the pellets contained therein.

FIG. 2 illustrates the schematic view of composition 10 within container 20 of FIG. 1 illustrating the pressure created on pellets 12 by the weight of composition 10 within container 20. The deeper that pellets 12 are within composition 10 in container 20, the greater the force that will be placed on pellets 12 by the pressure created by the weight of composition 10. Since fine material 14 fills in the free voids and interstices 16 between pellets 12, the force applied against the pellets by the pressure created by the weight of composition 16 is evenly distributed on all sides of pellets 12.

For example, pellets 12A within composition 10 near the top of container 20 have relatively little pressure $F_1$ placed around them by composition 10. Deeper within composition 10 in container 20, greater pressure is placed on pellets 12B in the middle portion of container 20. The uniform pressure is applied circumferentially around pellets 12B. Pellets 12B are under a greater pressure $F_2$ then pellets 12A, which reside within composition 10 near the top of container 20. Pellets 12C of the tacky, deformable material reside at the bottom of composition 10 within container 20. These pellets 12C receive even greater amounts of pressure placed upon them, since the majority of weight of the composition 10 resides above these pellets 12C. The pressure $F_3$ is applied circumferential around the pellets 12C in a uniform manner.

The uniform application of pressure around each of the respective pellets 12A, 12B, 12C of the tacky, deformable material occurs because fine material 14 fully occupies the interstices between pellets 12A, 12B, 12C and fully surrounds pellets 12A, 12B, and 12C. As the pressure is increased within composition 10 and as fine material 14 push inward on pellets 12A, 12B, 12C, counteracting forces from pellets 12A, 12B, 12C push against fine material 14 so that uniform pressures are applied on all sides of pellets 12A, 12B, 12C whether the force of the pressure is great or small. These equally applied pressures prevent, or at least minimize, deformation of pellets 12A, 12B, 12C. Further, since fine material 14 occupies the interstices 16 between pellets 12A, 12B, 12C, and pellets 12A, 12B, 12C are only minimally deformed within composition 10, the pellets do not readily come in contact with one another. Thereby, pellets 12A, 12B, 12C are prevented from coagulating or coalescing together in large amounts even under pressures at which these pellets would normally coagulate and coalesce together when no fine material is placed between such pellets. Further, composition 10 tends to keep pellets 12A, 12B, 12C of deformable material intact at elevated temperatures.

Composition 10 when comprised of asphalt pellets and fine powder can be stored at heights of up to and beyond six feet and temperatures up to and beyond 150° F. without adversely affecting the flowability of the composition. Thereby, incremental use of composition 10 is available, as well as incremental feed into an apparatus for mixing the composition alone or with other materials to make the composite material. By having the composition mixed in such a way that fine material 14 occupies the voids between pellets 12, composition 10 is rendered more stable and more temperature resistant.

Pellets 12 of composition 10 may have a diameter of between about 1/32 of an inch (0.031 inches) to about 3/4 of an inch (0.750 inches). In some embodiments, the diameter of the pellets may range between about 1/8 of inch (0.125 inches) to about 3/8 of an inch (0.375 inches). Pellets 12 of the tacky, deformable material can be micropellets with a diameter less than 0.040 inches, so as to dispense and soften quickly. These micropellets quickly absorb the heat necessary to soften and melt, thereby speeding up the mixing process.

The term "container" as used herein is broadly interpreted to encompass not only normal bags and packaging used within different industries, such as the asphalt concrete industry, but also to include truck beds, railway cars and the like. Container 20 may have rigid walls 22, 24 and a rigid bottom 26. Rigid walls 22, 24 help hold the composition in place within container 20 to prevent the unnecessary settling out of the material. Rigid walls 22, 24 help prevent a jostling of the materials that causes either the heavier pellets or the heavier fine material, depending on the materials used for each, from settling to the bottom of the packaging. To further help hold the composition in place, the top of the packaging may be shrink-wrapped to secure the composition until such time that it will be processed. Container 20 can be in any shape or size that is conducive for the end use of composition 10. Container 20 can also be packaging made of material that can be thrown into the mixer with the composition contained therein. For example, the packaging can be a polyethylene material that facilitates the binding process and acts as an additional amount of binder material.

Figure 3:
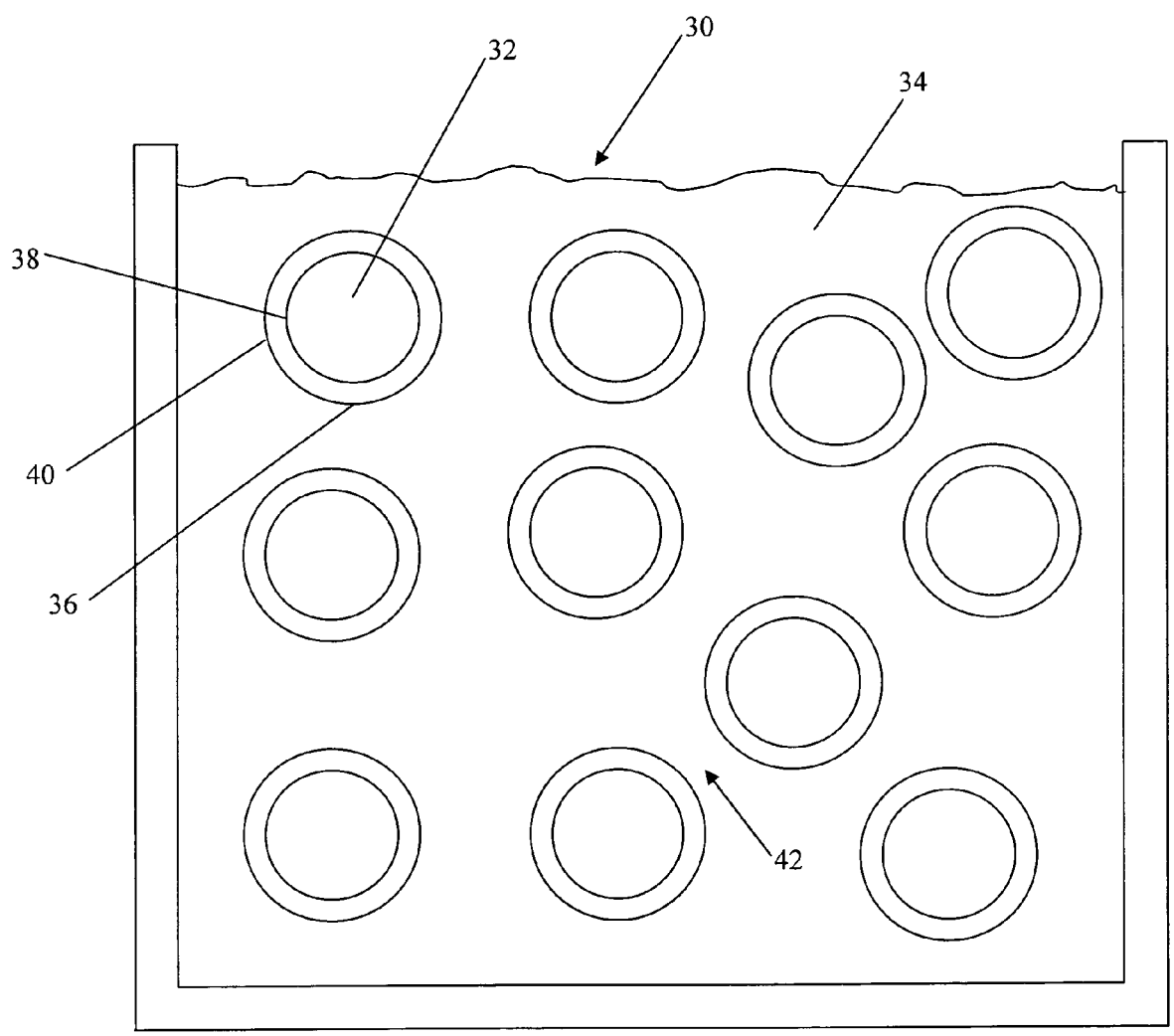
FIG. 3 illustrates a cross-sectional schematic view of a composition according to another embodiment in the present subject matter with coated pellets of a tacky deformal material dispersed within a fine material.

FIG. 3 illustrates another embodiment of the present subject matter in which the composition, generally designated as 30, includes pellets 32 disbursed within fine material 34. Pellets 32 have a coating 36 which surround an outer circumference 38 of pellets 32. Coating 36 may include a polymeric resin or a wax, which provides a non-tacking outer surface 40 for pellets 32. In this matter, even if pellets 32 come in contact with one another, outer coatings 36 of pellets 32 prevent pellets 32 from sticking together. Further, as described above, pellets 32 are disbursed in fine material 34 such that fine material 34 fully occupies interstices 42 between pellets 32. In this manner, as already discussed, the pressure created by the weight of composition 30 is evenly distributed circumferentially on all sides of pellets 32, thereby preventing any deformation of pellets 32 which may compromise coatings 36 surrounding pellets 32. Thus, since pellets 32 are not easily deformed while contained within fine material 34, the flowability of composition 30 is further increased because coatings 36 around pellets 32 are not likely to be compromised. Coatings 36 prevent pellets 32 from sticking together if pellets 32 come in contact with one another.

Alternatively, the coatings around the pellets can be created by a two-step coating process as disclosed in U.S. Pat. No. 5,688,449 to Fox, which is incorporated herein in its entirety. The inner coating layer may be a polymeric binder with a second outer coating layer of a powdery fine material, such as a blowing agent, to provide an outer covering of pellet 32. An embodiment may include fine material 14 as the powdery fine material used as the outer coating layer. The second outer coating layer may further enhance the flowability of the composition.

The embodiments illustrated in FIGS. 1, 2 and 3 may vary in the amount of tacky, deformable material within the pellets and the fine material which surround the pellets within the composition. For example, the pellets of tacky, deformable material may comprise about 50 percent of the composition by volume, while the fine material may also comprise about 50 percent by volume of the composition. Further, depending on the mixture of materials that comprise the fine materials and the type of tacky, deformable material used within the pellets, the percentage of material by weight may also vary. For example, the fine material may comprise at least about 25 percent by weight of the composition. Further, the pellets of tacky material may comprise at least about 25 percent of the weight of the composition. Again, as outlined above, the ratio of materials either by weight or volume within the composition depends on the final formula composite material to be created from the composition and desired properties of the composite material.

Figure 4:
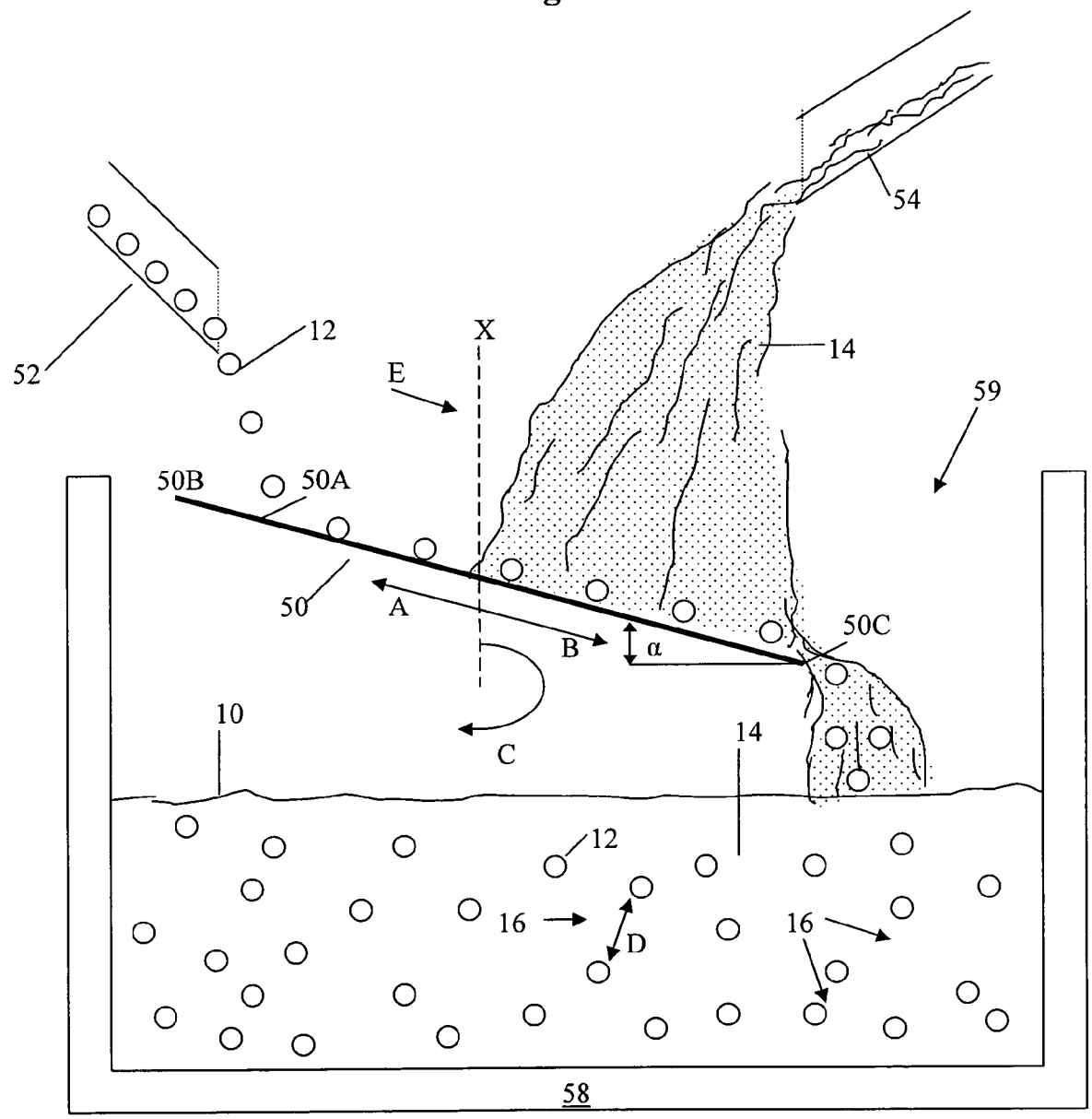
FIG. 4 illustrates a schematic view of an embodiment of a process of creating a composition according to the subject matter.

FIG. 4 illustrates a schematic view of an embodiment for a process of making composition 10. A rotating, vibrating platform 50 is provided on which the pellets 12 and fine material 14 are simultaneously distributed. Pellets 12 are provided for distribution into composition 10 by a pellet feeder 52. A fine material feeder 54 may be provided for facilitating the distribution of fine material 14 into composition 10. A mixing container 58 is provided into which a composition may be distributed as pellets 12 and fine material 14 are mixed together.

Pellet feeder 52 may extend from different pellet forming mechanisms such as a prilling station, an underwater pelletizer, etc. For example, an underwater pelletizer, such as those manufactured by Gala Industries, Inc., of Eagle Rock, Va. may be used. Underwater pelletizers are commonly used within the polymer industry to form pellets. Examples of underwater pelletizers are disclosed in U.S. Pat. No. 4,728,276 and U.S. Pat. No. 3,196,487, both of which are incorporated herein by reference. As an example, the usual underwater pelletizer basically extrudes the tacky, deformable material through a passage way with a rotating cutter blade rotating about the face of the underwater pelletizer. As the tacky, deformable material leaves the passage way out of the face of the underwater pelletizer, the cutter blades cut the strands of extruded material into pellets within a water box which holds water or some other form of liquid that is circulated to cool and harden the pellets. The slurry of pellets is then conveyed to an outlet of the water box. The pellets may then be passed to a dryer, such as a centrifugal dryer, for drying the pellets before they are passed to pellet feeder 52 for disbursement into composition 10. Such dryers are known in the art.

The water or other cooling liquid within the water box of the underwater pelletizer can cool the pellets to a temperature below the ambient temperature that renders the tacky, deformable material temporarily non-tacky and hard. The term "non-tacky" as used herein means that the tackiness of the material is greatly reduced. For example, asphalt pellets may be cooled to a temperature ranging from below about 35° F. to about 55° F. depending on the material used. By cooling the pellets of tacky, deformable material to such a temperature, the pellets can be more easily handled for distribution into composition 10.

The cooling of pellets 12 to a temperature that temporarily renders the material of the pellets non-tacky and hardened may be done in different ways depending on the type of pellet formation mechanism that is used. For example, if a prilling tower is used to form the pellets, the stream of air into which the droplets of the tacky, deformable material are dropped may be chilled to a temperature that temporarily renders the material non-tacky and hardened before the pellets are collected and fed into composition 10. In any event, the cooling of the pellets can greatly facilitate distribution of pellets 12.

At the same time that pellets 12 are being distributed into a mixing container 58, fine material feeder 54 distributes fine material 14 into container 58. Fine material 14 may be provided by a process for creating fine material 14 to which fine material feeder 54 is attached. Alternatively, fine material 14 may come from pre-processed material. For example, bags of fine material 14 may be poured into a funnel from which fine material feeder 54 extends for feeding fine material 14 into composition 10.

Pellets 12 and fine material 14 fall onto rotating, vibrating platform 50 that is positioned within or proximal to an opening 59 of the mixing container 58. Rotating, vibrating platform 50 helps to mix fine material 14 and pellets 12 together so that pellets 12 are evenly dispersed within fine material 14. Fine material 14 fully occupies interstices 16 between pellets 12 to help create a composition that is easily flowable. The rotating, vibrating platform 50 vibrates back and forth in directions A and B to jostle pellets 12 and fine material 14 that land on a top surface 50a of rotating, vibrating platform 50. At the same time, rotating, vibrating platform 50 rotates in a direction C about an axis X. The rotation of platform 50 may be in either direction.

Platform 50 may be tilted at an angle $\propto$ to facilitate the mixture of pellets 12 and fine material 14 in mixing container 58 to create composition 10. As pellets 12 and fine material 14 hit platform 50, fine material 14 and pellets 12 slide in the direction E from an upper side 50b to a lower side 50c of rotating platform 50. As rotating, vibrating platform 50 rotates, lower side 50c travels around the axis X so that fine material 14 and pellets 12 are relatively evenly distributed within the mixing container 58 to create composition 10.

Mixing container 58 may be the final packaging or container in which composition 10 is to be shipped and/or sold for use. Mixing container 58 also may be a container that is only used to collect composition 10 as it is created. The composition within mixing container 58 may then be dispersed into other packaging for shipment and use. As described above, container 58 can also be packaging made of material that can be thrown into the mixer with the composition contained therein. For example, the packaging can be a polyethylene material that facilitates the binding process and acts as an additional amount of binder material.

Figure 5:
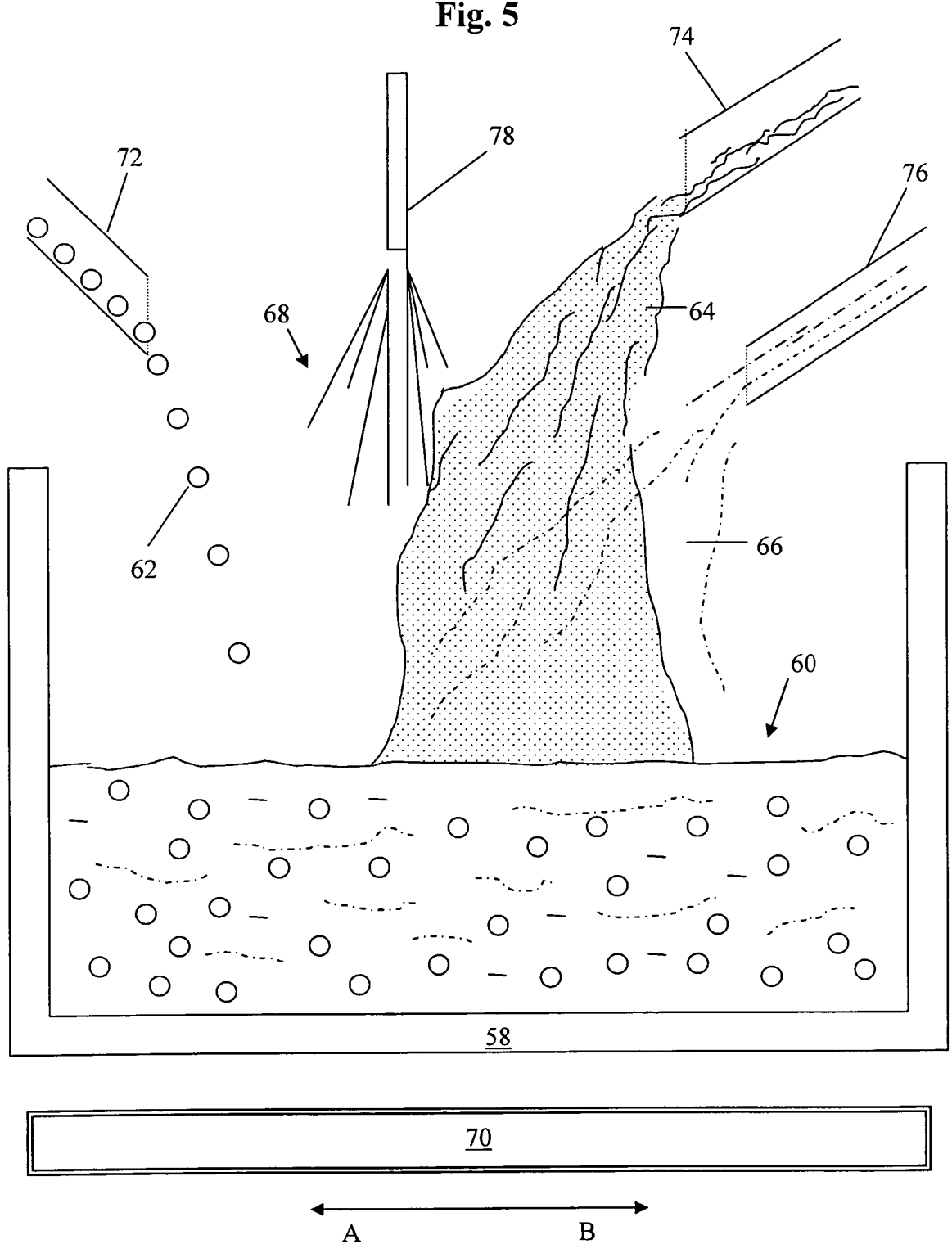
FIG. 5 illustrates a schematic view of a further embodiment of a process for creating a composition according to the present subject matter.

FIG. 5 illustrates a further embodiment of a process for making a composition, generally designated as 60. A composition 60 includes pellets 62 dispersed in a mixture of fine powder 64 and fibers 66. A liquid mist 68 may be sprayed into the mixture of pellets 62, powder 66, and fibers 66 to temporarily add cohesiveness and to cut down on dust creation.

A vibrating platform 70 is provided. Mixing container 58 is provided on the platform 70. A pellet feeder 72 feeds pellets 62 into the mixing container 58 to become part of the composition 60. A powder feeder 74 feeds fine powder 64 into mixing container 58 to also become part of the composition 60. Vibrating platform 70 shifts back and forth in directions A and B to facilitate the disbursement and separation of pellets 62 within the mixture of powder 64 and fibers 66 in mixing container 58. A fiber feeder 76 is also provided to supply fine fibers 66 to be included in composition 60. A sprayer 78 may provide liquid mist 68.

As described above with respect to FIG. 4, the pellets created in FIG. 5 may be formed by an underwater pelletizing process. Other forms of creating the pellets such as prilling may be used to form the pellets. Pellets 62 can then be cooled either through chilling within a low temperature liquid or through other means. Powder 64 may be any suitable powder used in creating the intended composites material, which are listed above. Fibers 66 may be mineral and/or cellulosic fibers. The mixture of powder 64 and fibers 66 constitute the fine material within composition 60. The mixture is used to give composition 60 desired properties attributable to the specific powder used as well as the specific fibers being distributed into composition 60. Liquid mist 68 may be used as a stabilizer to help stabilize composition 60 during mixing and packaging. Liquid mist 68 may comprise water, latex, sodium silicate, light oil, mineral oil, or other adhesive substance that will evaporate or breakup at some time before use of composition 60 to make the composite material.

Figure 6:
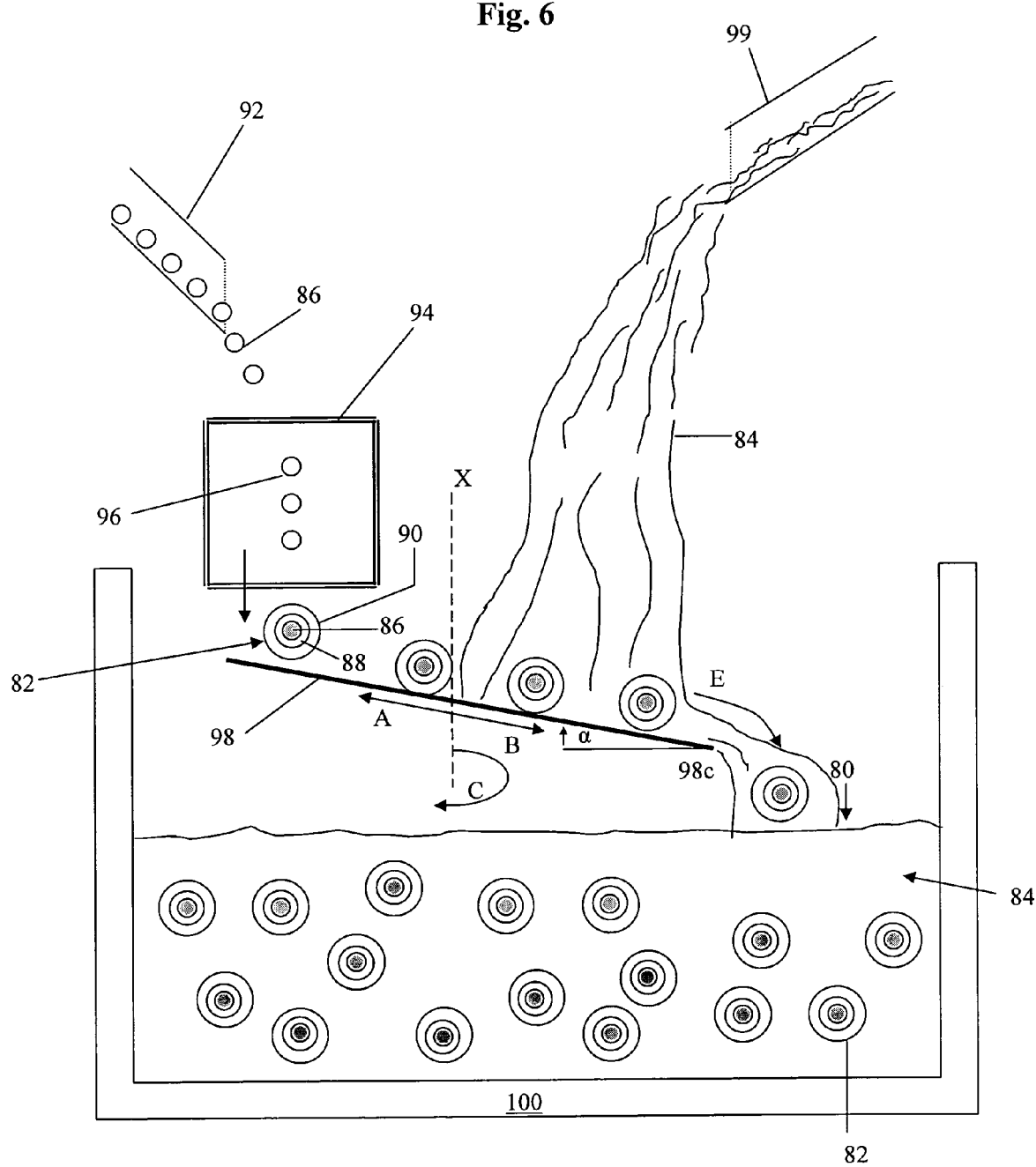
FIG. 6 illustrates a schematic view of an embodiment of a process for creating a composition of pellets of asphalt and a fine powder used in a final formula of an asphaltic mixture according to the present subject matter.

FIG. 6 shows a schematic view of a further embodiment of the process for creating a composition, generally designated as 80. Composition 80 includes coated pellets of asphalt 82 dispersed within a fine powder 84 such that fine powder 84 occupies the interstices between pellets 82 minimizing pellet to pellet contact. Pellets 82 comprise uncoated pellets 86 of asphalt material with an inner coating layer 88 and an outer coating layer 90. Uncoated asphalt pellets 86 are fed by pellet feeder 92 into a coating process 94. Coating process 94 may comprise a coating process similar to the process disclosed in U.S. Pat. No. 5,688,449 discussed above in reference to FIG. 3. Uncoated pellets 86 may have been cooled to a temperature rendering the asphalt temporarily hardened and non-tacky in the pellet forming process. Pellet feeder 92 then feeds uncoated pellets 86 into two-step coating process 94. First, the pellets are covered with a polymer binder, for instance, by tumbling pellets 86 with the polymeric binder. The polymeric binder forms a first coating layer 88 around circumferences 96 of uncoated pellets 86. The second outer coating layer 90 may be applied by sprinkling a powdery fine material, such as a blowing agent, onto the coated pellets in the drum. For example, fine powder 84 may be used to create the second outer coating layer 90.

Alternatively, a single step coating process may be used to add the coating around asphalt pellets 86 to form a composition similar to the composition described with reference to FIG. 3. Other common coating methods may be used to create the coating, which covers the outside of asphalt pellets 86.

After pellets 86 are coated in coating process 94, coated pellets 82 are dispensed onto a rotating, vibrating platform 98. Simultaneously, fine powder 84 is distributed from powder feeder 99 onto vibrating, rotating platform 98 where coated pellets 82 and fine powder 84 are mixed together through the vibration in directions A and B of rotating, vibrating platform 98. As described in reference to FIG. 4, platform 98 can rotate in direction C, about an axis X. Further, platform 98 may be tilted at an angle $\propto$ to facilitate the moving of the mixture of coated pellets 82 and fine powder 84 off of platform 98 in a direction E. As platform 98 rotates in direction C, a lower side 98c of the platform disperses the mixture of fine powder 84 and coated pellets 82 such that coated pellets 82 are separated within fine powder 84 within mixing container 100.

Mixing container 100 may be the final packaging or container in which composition 80 is to be shipped and/or sold for use. The mixing container also may be a container that is only used to collect composition 80 as it is created. Composition 80 within mixing container 100 may then be dispersed into other packaging for shipment and use. As described above, container 100 can also be packaging made of material that can be thrown into the mixer with the composition contained therein and that facilitates the binding process and acts as an additional amount of binder material.

Composition 80 comprising coated pellets 82 within fine powder 84 can comprise part of a final mix to be used in hot mixes and the like. Fine powder 84 may be limestone or aggregate fines, which are used in the hot mix. The added fine powder 84 is used as part of the final formula for the hot mix. The mixture not only provides an opportunity to create the hot mix incrementally without using all of the composition to create a large batch but the composition also reduces the steps of making the final hot mix blend, which a user will have to perform in making asphalt pavement or concrete.

For example, a typical stone mastic asphalt ("SMA") mix may include:
- 124.2 pounds of AC 20 asphalt binder with SBS polymer mixed therein;
- 8 pounds of cellulosic fiber;
- 20 pounds of hydrated lime; and
- 1848 pounds of aggregate with 3 percent, or 55 pounds, of the aggregate being smaller than 0.0008 inches and 10 percent, or 185 pounds, of aggregate smaller than 0.003 inches and larger than 0.0008 inches.

By mixing the 20 pounds of hydrated lime, 8 pounds of fiber, 55 pounds of 0.0008 inch aggregate powder and 85 pounds of 0.003 inch aggregate powder, a mixture of 168 pounds of fine powder can be created. The 124.2 pounds of the asphalt binder can be formed into pellets in an underwater pelletizer. The pellets of the asphalt binder and the mixture of powder can then be simultaneously fed together to create a composition where the pellets of the tacky asphalt binder are dispersed within the mixture of powder such that the pellets are separated from each other and the powder fills the interstices between the pellets to create a composition to facilitate creation of SMA asphalt pavement or concrete.

This composition can then be mixed with 1708 pounds of aggregate. This amount of aggregate is an adjustment to take into account the material included in the composition. The aggregate has had its fines gradation adjusted to no aggregate smaller the 0.0008 inches and 100 pounds of aggregate between 0.0008 inches and 0.003 inches. The aggregate can be preheated to a normal temperature of 350° F. The 292.2 pounds of composition can then be mixed in the heated aggregate to create the SMA pavement or concrete. The heat from the aggregate causes the tacky, deformable pellets of asphalt binder to liquefy, thereby coating the aggregate and the powder, which helps to absorb the asphalt binder to create the SMA hot mix for pavement or concrete.

Figure 7:
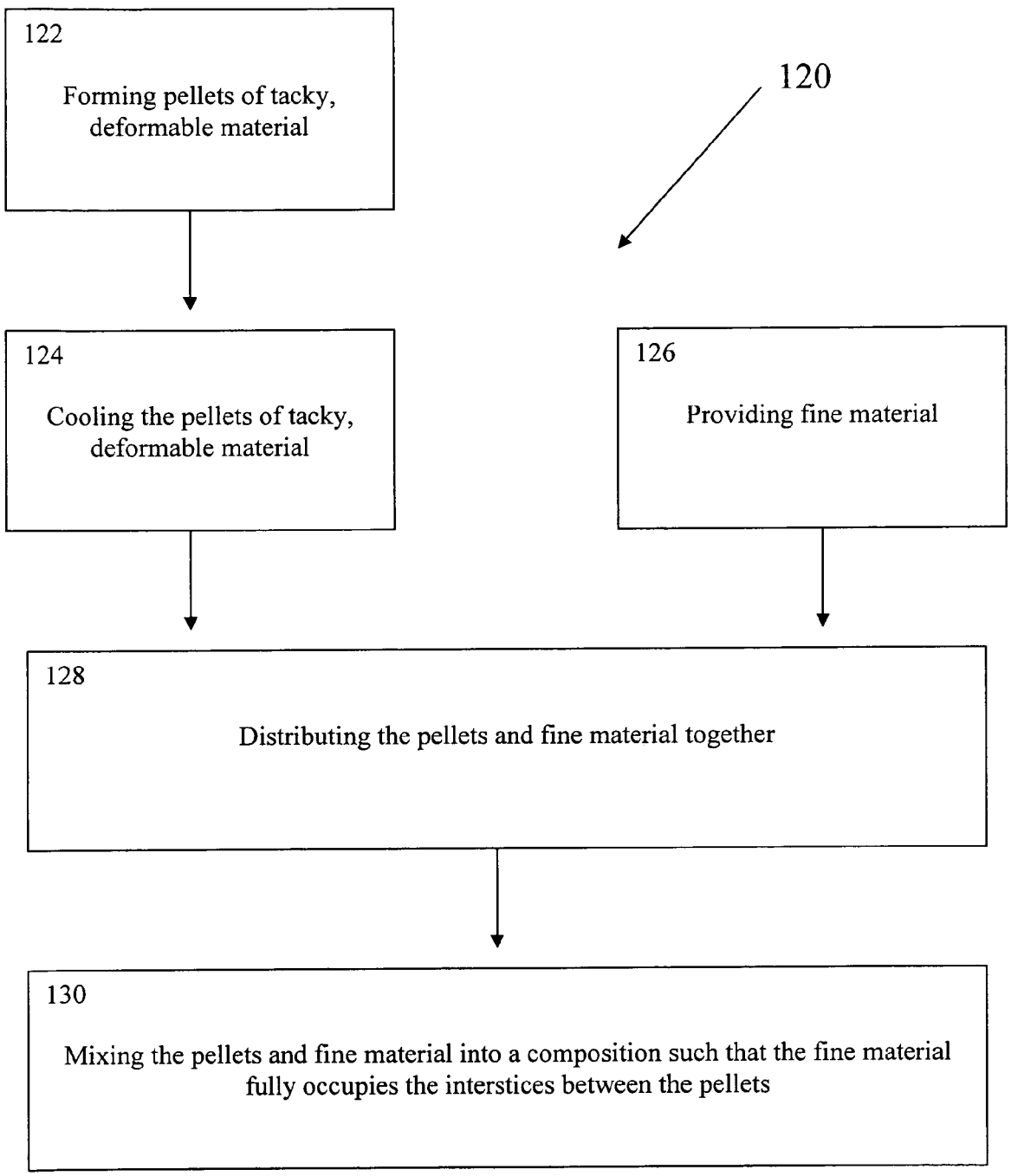
FIG. 7 illustrates a flow diagram of an embodiment of a process for creating a composition according to the present subject matter.

FIG. 7 shows a flow chart of an embodiment of a process, generally designated as 120, for creating a composition containing pellets of tacky, deformable material and a fine material, as discussed in detail above. To create the composition, the pellets are formed from tacky, deformable material in step 122. In step 124, the pellets are cooled to a temperature at which the pellets are temporarily rendered non-tacky and hardened. The fine material to be mixed with the pellets to create the composition is provided in step 126. Both the pellets of tacky, deformable material and the fine material are distributed simultaneously together into a mixing container in step 128. The pellets of the tacky, deformable material and the fine material are then mixed together such that the pellets of tacky, deformable material are separated from one another with the fine material occupying the interstices between the pellets and fully surrounding the pellets in step 130.

Figure 8:
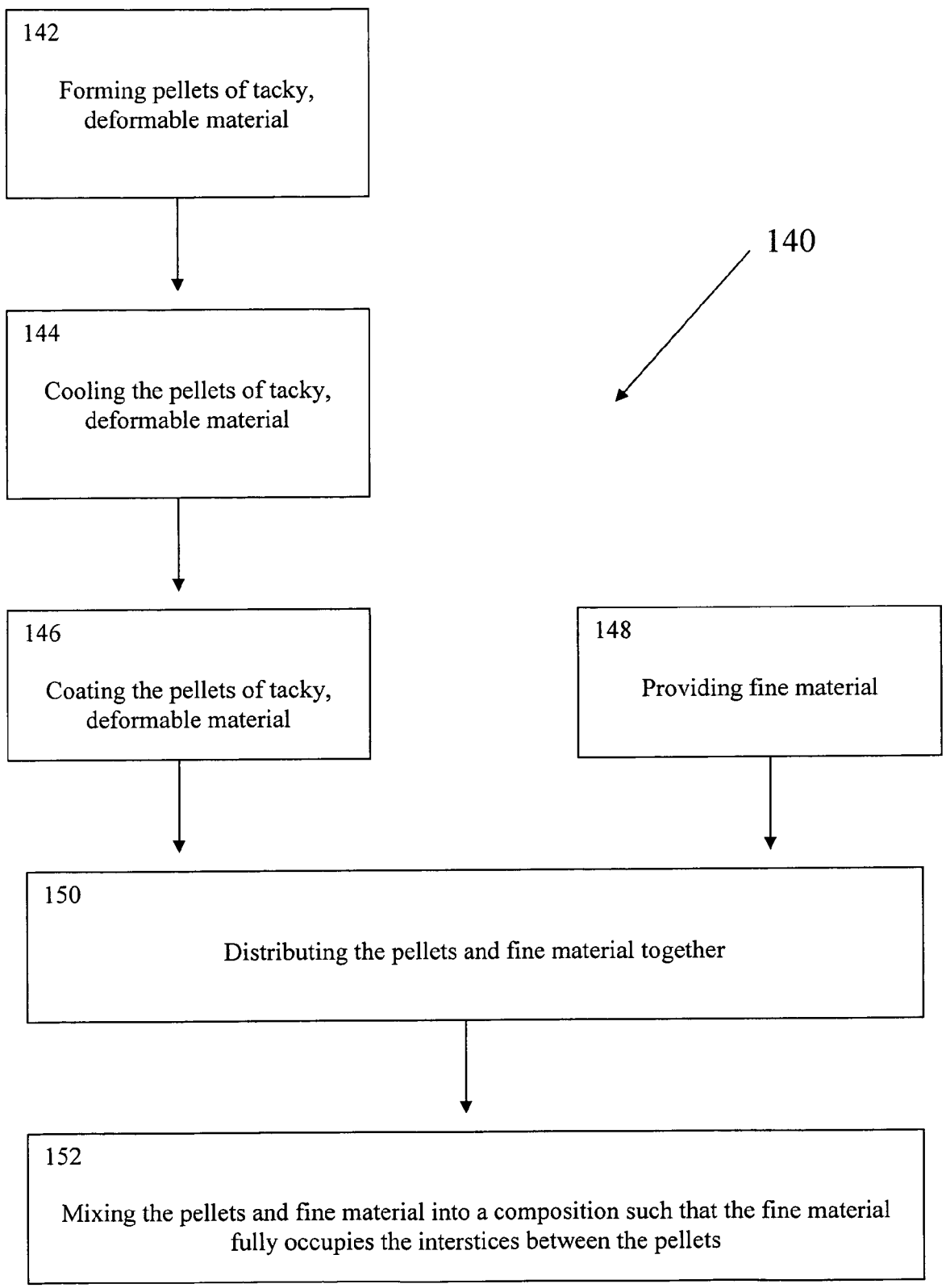
FIG. 8 illustrates a flow diagram of a further embodiment of a process for creating a composition according to the present subject matter.

FIG. 8 shows another flow chart of an embodiment of a process, generally designated as 140, by which to create the compositions described above. Process 140 includes a step 142 of forming pellets of tacky, deformable material such as asphalt. The pellets are cooled to a temperature that temporarily renders the pellets hardened and non-tacky in step 144. The pellets are then transferred to a coating process for coating the pellets with an outer coating material in step 146. In step 148, fine materials are provided which are to be mixed with the pellets to create the composition. The coated pellets and the fine material may then be distributed together in step 150. In step 152, the coated pellets and the fine material are then mixed together so that the pellets are separated from one another with the fine material occupying the interstices between the coated pellets, thereby surrounding the coated pellets.

The asphalt compositions describe above can also be used in making warm mix asphalt ("WMA") which has other additives added in to lower the temperature at which the asphalt may be created to eliminate the smell and pollutions created under normal hot mix asphalt conditions. The additives, which are used to create WMA asphalt, such as SASOBIT sold by Sasol Wax Americas, Inc. of Sheldon, Conn., may be included in the asphalt pellets. Further, if such additives are provided in powder form and are non-tacky, such additives may be included in the fine mixed powders within the composition.

Figure 9:
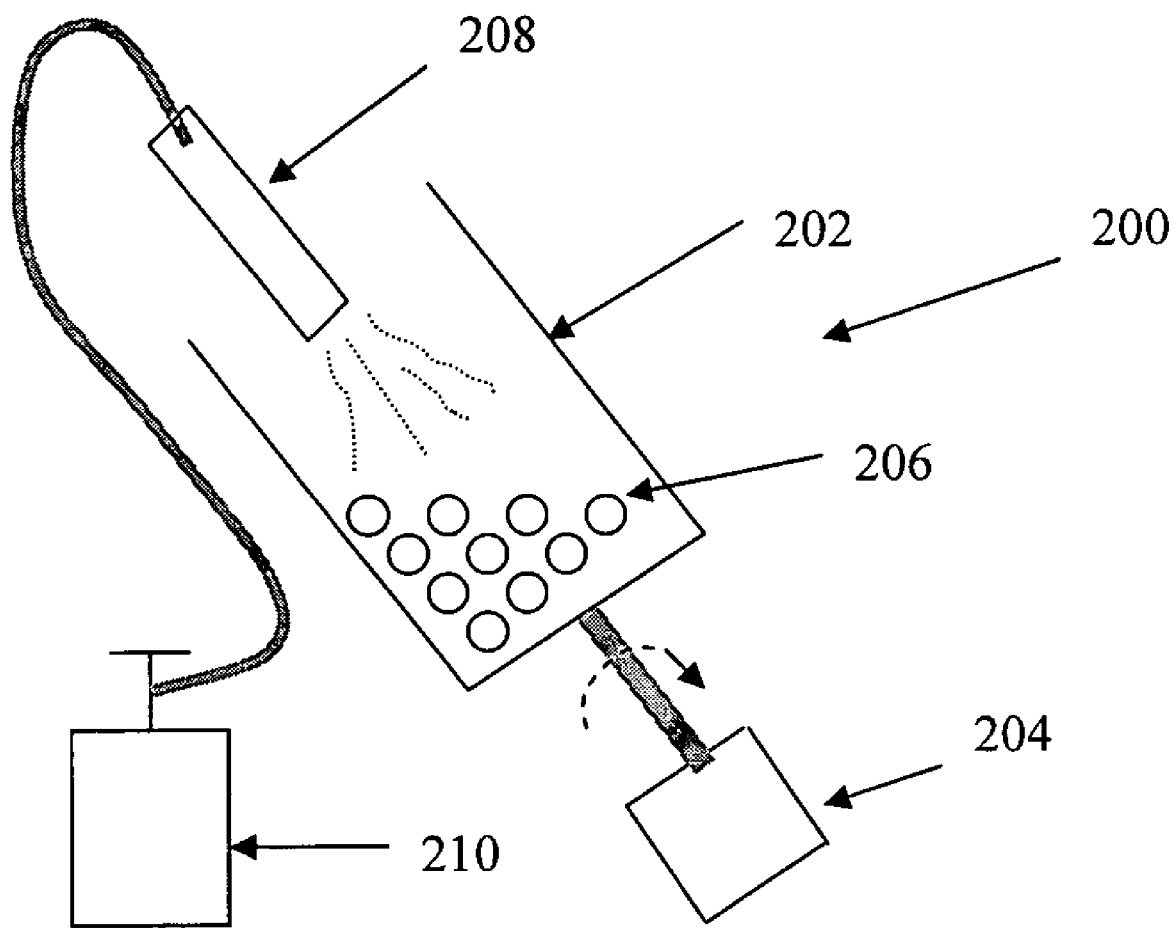
FIGS. 9-11 illustrate schematic views of steps in a process for manufacturing an asphaltic mixture at a target location according to the present subject matter.
Figure 10:
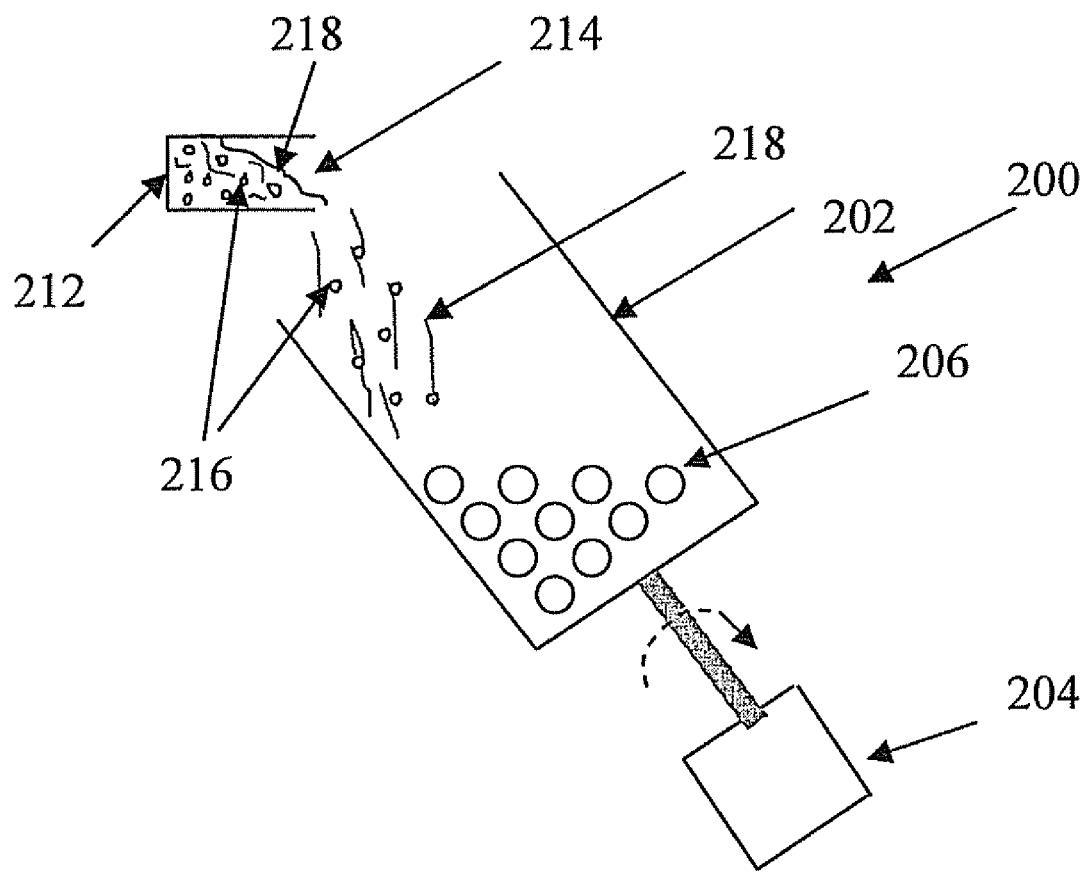
Figure 11:
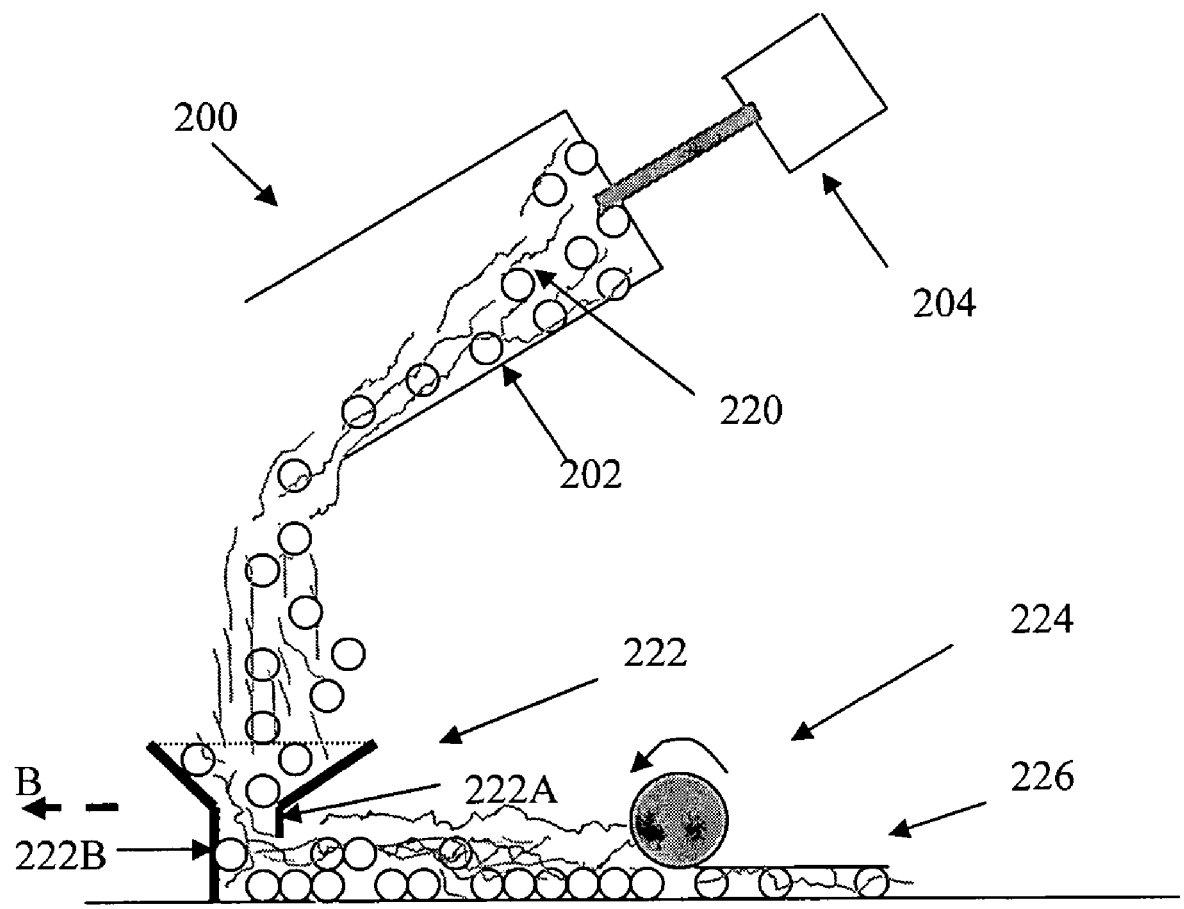

FIGS. 9-11 illustrate a method of making hot mix at a location of use where a mixer unit 200 that includes a mixing chamber 202 is moved within proximity of the location where the hot mix is to be used. The mixer unit 200 that contains the mixing chamber 202 can be of different sizes, weighing as little as a few pounds, a few hundred pounds, or several tons. The mixer unit 200 can include a motor 204 that can drive the mixing chamber 202. A portion of the aggregate gradation, in particular, the stone aggregate 206 based on a gradation to be used in the hot mix can be provided.

As shown in FIG. 9, the pre-weighed stone aggregate 206 is placed in mixing chamber 202 driven by motor 204. A heater 208 is provided that is used to heat the stone aggregate 206. The heater 208 can be a direct heating source, for example a flame source or heating coils with blowers. As the motor 206 rotates mixing chamber 202, the heater 208, which can be controlled through a control unit 210, heats the stone aggregate 206 to a desired temperature, for example, between about 300° F. and about 450° F. The control unit 210 can be a power supply or fuel supply. Once the stone aggregate has been heated to an acceptable level, heater 208 is then turned off.

As shown in FIG. 10, a package 212 is provided of a composition 214 as described in detail above of discrete substances that are capable of being mixed together to form a composite material upon proper heating. The composition 214 includes a plurality of pellets 216 of a tacky, deformable material as described above dispersed within a flowable fine material 218 as described above. The fine material portion 218 can comprise at least a portion of the fine material of the aggregate gradation of the hot mixture. The composition 214 resides in the package 212 such that the fine material 218 occupies the interstices between the plurality of pellets 216 in a manner that minimizes pellet to pellet contact. The composition 214 can be pre-weighed. The pre-weighed composition 214, which can be stored at ambient temperature, is then placed in the mixing chamber 202 of the mixer 200 with the heated stone aggregate 206. The heat from the heated stone aggregate 206 softens and/or melts the pellets 216 as the stone aggregate 206, the fine material 218 and the pellets 216 of tacky, deformable material are mixed together. The mixing continues until the pellets 216 are melted and the stone aggregate 206 is coated with the mixture of fine material and the tacky, deformable material.

As shown in FIG. 11, the newly formed hot mix 220 can then be discharged from the mixing chamber 202 of the mixer 200 into the forming device, such as a paving device 222 moving in a direction B and the process is repeated as necessary to complete the task. The paving device 222 is often followed by a compacting roller 224, thus producing a finished pavement 226. The small continuous hot mix forming device depending on the configuration of its walls 222A and 222B can extrude shapes such as curbs, edges, and walkways.

This batch method above is used to illustrate the principle of the two component process and is not intended to represent the only specific method to accomplish this. Other methods include achieving the heating and addition of the composition of pellets and fine material in a continuous process similar to a drum mix plant where the pellets and fine material are added via gravimetric feed systems synchronized together to create a proper mix ratio, or using a pug mill that can be used to mix the composition of pellets and fine material together with the preheated aggregate.

By taking a portion of the fines normally used in the aggregate gradations to fill the interstices between the pellets, the asphalt can be transported and stored at ambient temperatures in pellet form. Thus, the need for a continuous heating of the asphalt is remove. Such measures can result in a significant energy savings.

Figure 12:
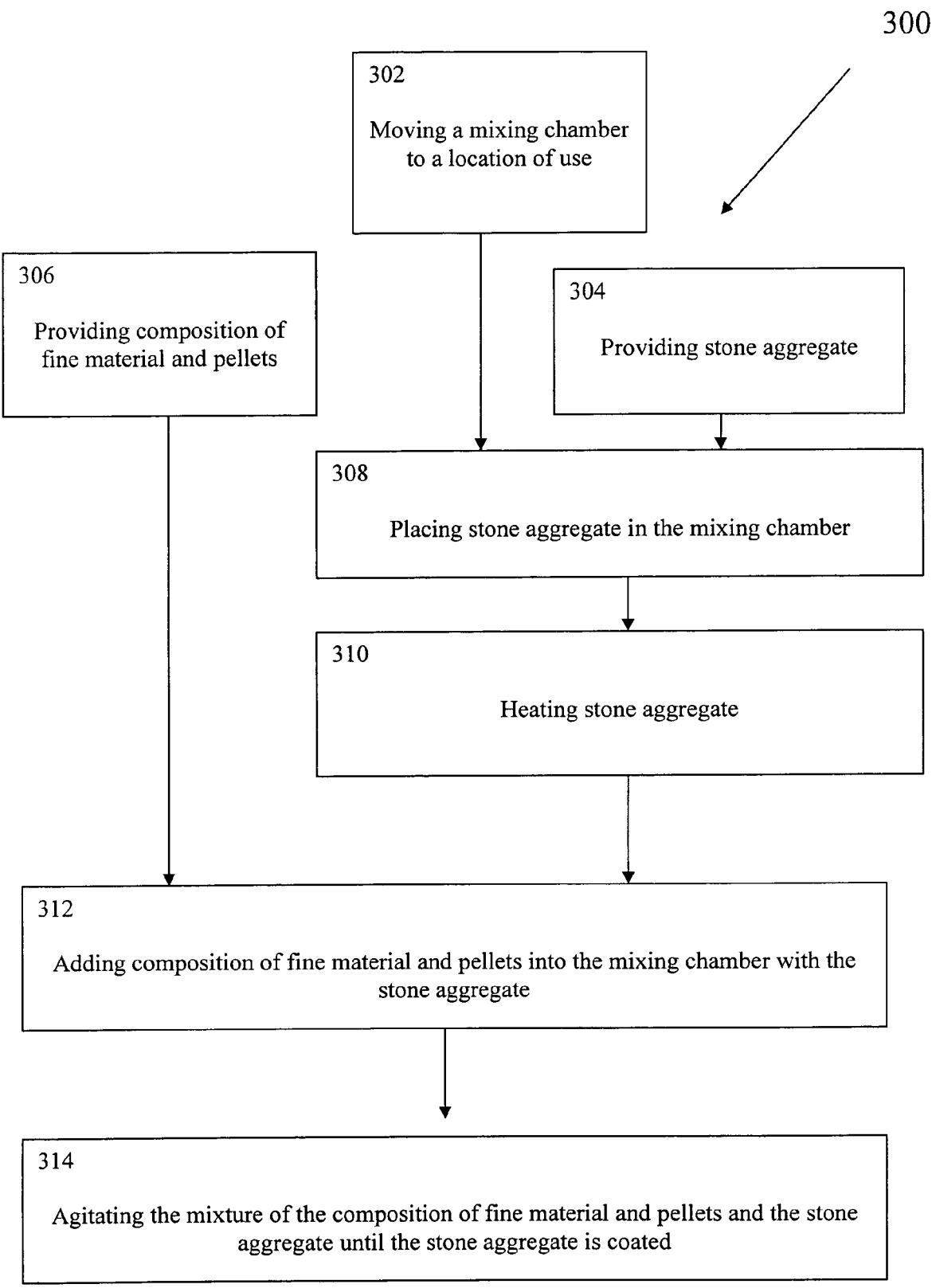
FIG. 12 illustrates a flow diagram of an embodiment of a process for manufacturing an asphaltic mixture at a target location according to the present subject matter.

FIG. 12 shows a flow chart of an embodiment of a process, generally designated as 300, used to manufacture hot mix at a location of use. Process 300 includes a step 302 of moving a mixing chamber within proximity of the location where the hot mix is to be used. A stone aggregate is provided based on a gradation to be used in the hot mix in step 304. A composition of discrete substances that are capable of being mixed together to form a composite material upon proper heating are provided in step 306. The composition includes a plurality of pellets of a tacky, deformable material dispersed within a flowable fine material such that the fine material occupies the interstices between the plurality of pellets in a manner that minimizes pellet to pellet contact. In step 308, the stone aggregate is placed in the mixing chamber. In step 310, at least a portion of the stone aggregate gradation is heated in the mixing chamber to a temperature sufficient to soften the pellets of a tacky, deformable material. The composition of discrete substances is added into the mixing chamber in step 312. In step 314, the mixture of the composition of discrete substances and the stone aggregate is agitated until the pellets of a tacky, deformable material soften and uniformly coat the stone aggregate and fine material.

As described above, the tacky, deformable material can comprise about 6% by weight of the total mix. The tacky, deformable material can be an asphaltic material or a polymer.

The polymer used in the composition can be a clear polymer. For example, the clear polymer can be an acrylic or polycarbonate. When such clear polymer is used, the aggregate can be colored for specific use, For example, the aggregate can be red, blue, yellow, green, etc. to show through the clear polymer to provide a decorative appearance. The fine material can also be colored.

The clear polymer can be a type of polymer that diffuses light, such as light from a light source. By diffusing light, the mixture can be used to better identify walkways, airfields, etc. Acrylic or polycarbonate are also useful for such embodiments.

The polymeric resin can crosslink upon heating to produce a nonthermoplastic material. The polymeric resin can be, for example, polyethylene that can be crosslinked with the addition of peroxides and heat activated to initiate the crosslinking. Such crosslinking is standard technology for polyethylene and other polymers and is used to produce different qualities in the polymeric resin. For example, the crosslinked polymeric resins can have higher tensile strength and better UV resistance which can be important properties for roadways, walkways, airfields, etc. Another crosslinkable polymeric resin is epoxy which can be heat activated to crosslink. For example, the epoxy can be a one or two part epoxy powder. All such crosslinkable polymeric resins need to be placed soon after activation and before full crosslinking occurs. Thus, by making the hot mixture at the location where it is to be placed is advantageous for hot mixtures containing crosslinkable polymeric resin.

The tacky, deformable material such as polymeric resins can also include an additive or chemical which will emit light previously absorbed from the sun. Such properties are useful for walkways, airfields, etc. so that such walkways, airfields, etc. stay lighted after dark. For example, glow in the dark additives such as polycrystalline inorganic sulfides can be used in conjunction with clear polymers like polystyrene, polyethylene, acrylics, etc. The additives can be added in the fine material or as part of the tacky deformable material by being mixed with the polymeric resin. Further, the tacky, deformable material can be a polymeric resin that can emit light when powered by an external energy source such as UV or RF energy.

As stated above, the pellets of the tacky, deformable material can be micropellets with a diameter less than 0.040 inches, so as to dispense and soften quickly. These micropellets quickly absorb the heat necessary to soften and melt, thereby speeding up the mixing process.

The tacky deformable material can be extracted from oil sand, also known as tar sand. Oil sand deposits are sand that can contain from about 8% to 18% bitumen. Such oil sand deposits are plentiful at Asphalt Ridge, Utah, outside Vernal, Utah, and in Alberta, Canada. In order to make the asphaltic content of the oil sand usable for paving and other commercial use, a large portion of the sand is removed by either solvent extraction or by water and surfactant. The remaining asphaltic content will typically be between about 40% and about 100% by weight rendering the mixture very tacky. Since these oil sands are typically in remote locations without heated storage means or heated transportation means, pelletization of the tacky concentrated asphaltic materials is a major advantage so as to facilitate ambient temperature storage and transportation in pellet form. Thus, pelletized asphalt would solve this problem thru ambient temperature storage and transport.

To heat the aggregate solar energy may be used. A focused solar energy can be used to create temperatures of about 300° F. to about 350° F. in the stone aggregate that is required to soften and disperse the tacky deformable material in making the hot mixture.

The hot mix can be discharged directly from the mixing chamber into a forming device such as an extruder, rollers, curb former, or other paving device. Thereby, the hot mix can be extruded into shapes such as curbs, edges, and walkways on demand at the location of use with such a forming device.

Figure 13A:
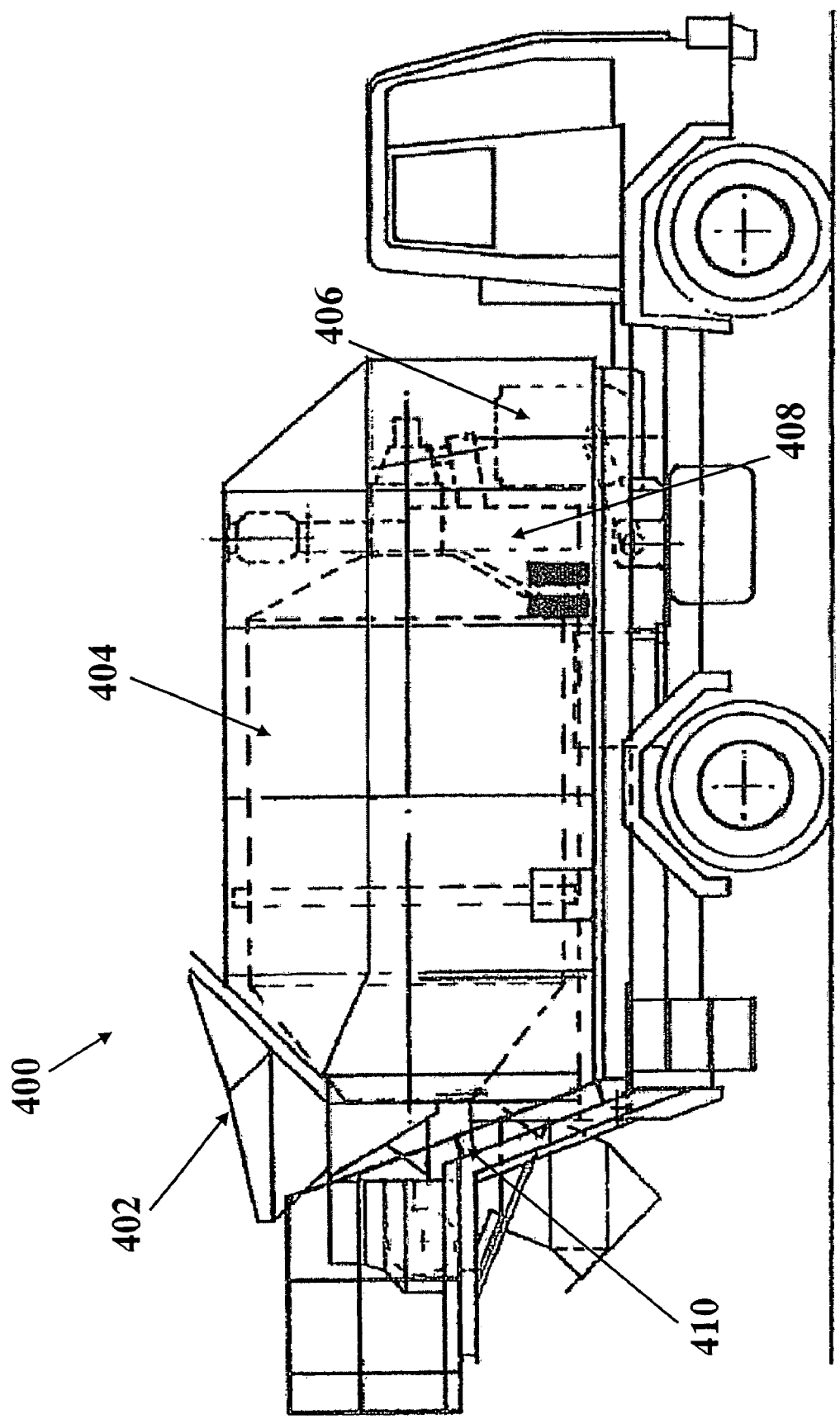
FIGS. 13A and 13B illustrate schematic views of embodiments of transportable mixing units that can be used to manufacture hot mix at a location where the hot mix is to be utilized according to the present subject matter.
Figure 13B:
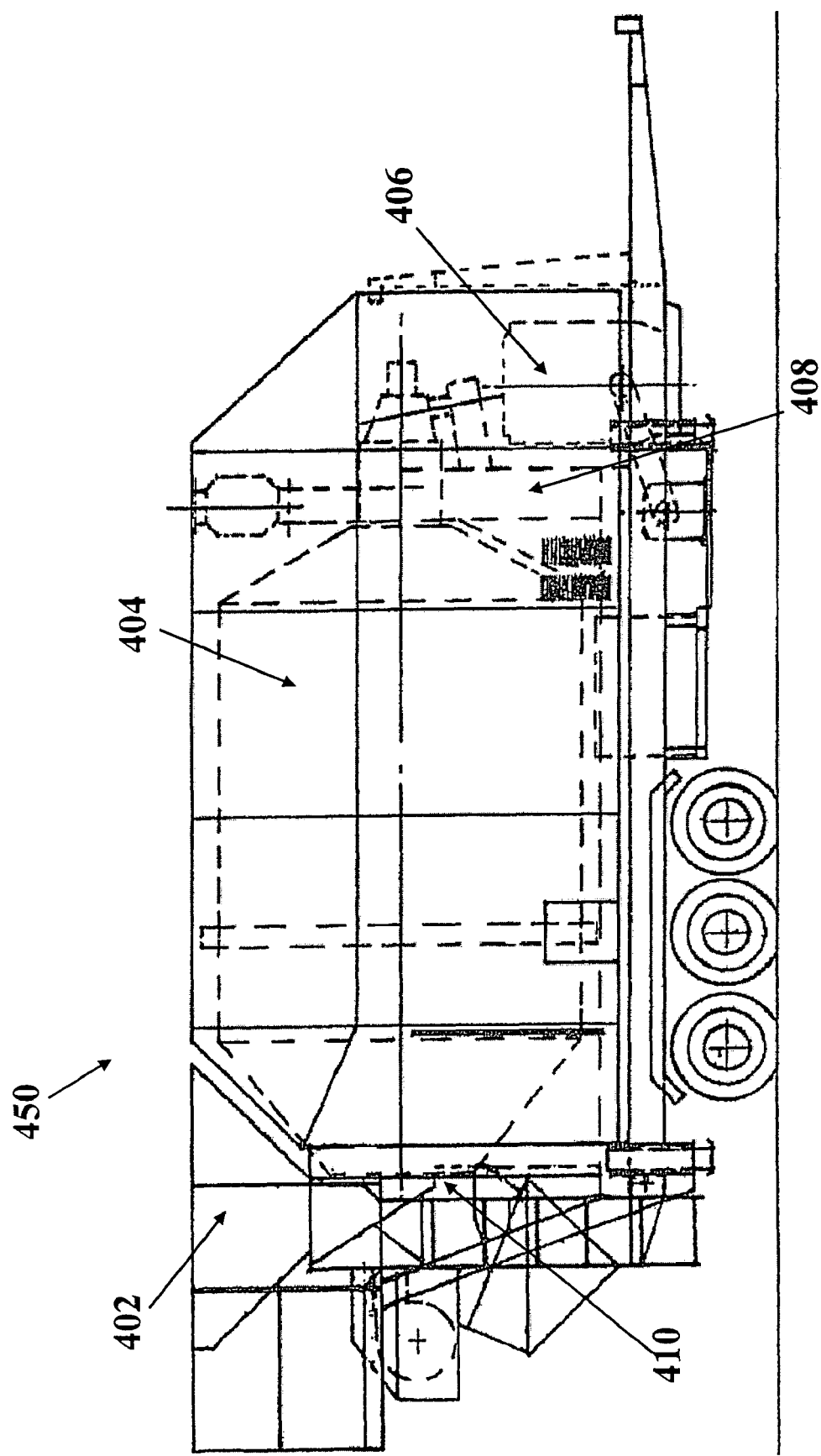

FIGS. 13A and 13B illustrate schematics of two similar mobile mixers used to manufacture hot mix at a location of use as described above. FIG. 13A shows a mobile mixer truck 400, while FIG. 13B shows a mobile mixer trailer 450. The components of each mobile mixer 400, 450 are similar so the same reference characters will be used in both Figures. In each mobile mixer 400, 450 an inlet 402 is provided for loading both the stone aggregate and the composition of pellets and fine material into a drum 404. Drum 404 rotates to provide the agitation for mixing and to aid in keeping the hot mix from settling prematurely. Drum 404 can be rotated by a diesel drive motor 406. Tilting lift 408 is in operable communication with drum 404 to tilt drum 404 to dispense the hot mix after proper mixture of the components. The tilting lift 408 can be a hydraulic cylinder secured to a rear portion of the drum 404 distal from the inlet 402. A burner can be place at 410 to heat the stone aggregate when entering the drum 404 through inlet 402.

Figure 14A:
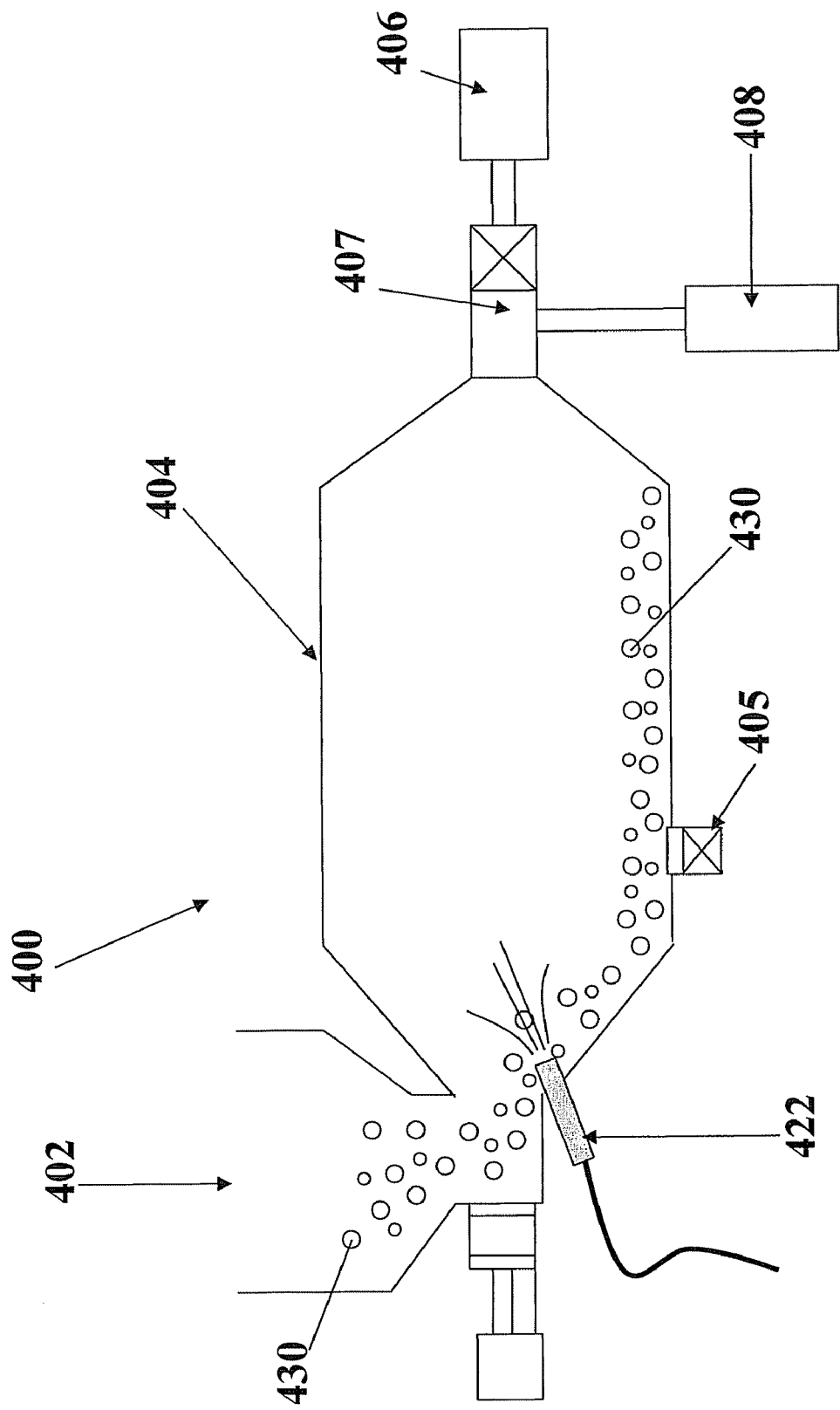
FIGS. 14A and 14B illustrate schematic views of the embodiment of a transportable mixing unit of FIG. 13A in use according to the present subject matter.
Figure 14B:
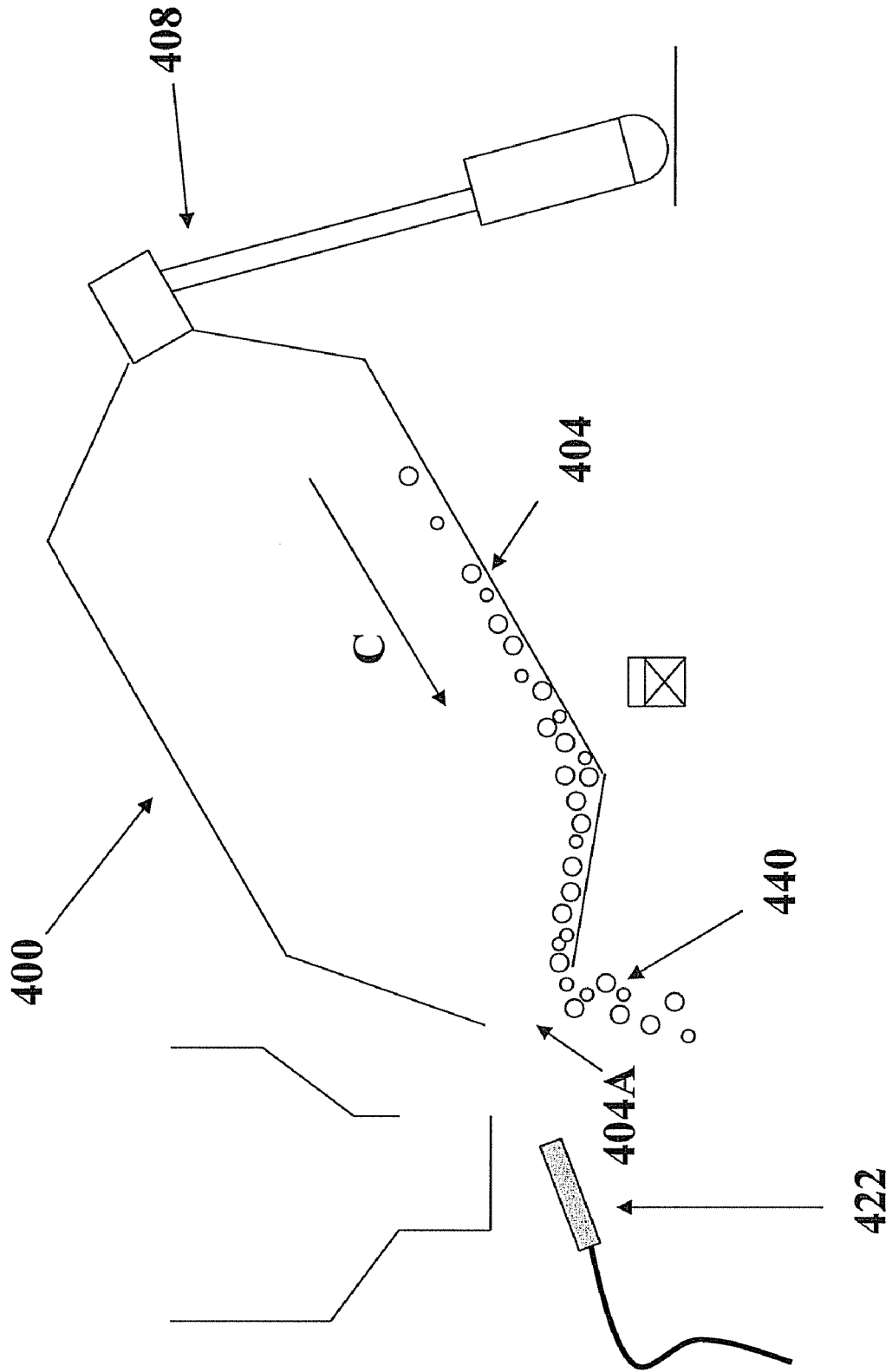

FIGS. 14A and 14B illustrate schematics of the working components of mobile mixer 400 when receiving and heating stone aggregate 430 into drum 404 through inlet 402 and dispensing hot mix from drum 404. In FIG. 14A, stone aggregate 430 is distributed into rotating drum 404. Stone aggregate 430 is heated by a burner 422 as drum 404 is rotated by motor 406. The rotation of drum 404 is facilitated by bearings 405 and 407, respectively. Through the burner 422 and the rotation of drum 404, heat is transferred to stone aggregate 430 until the stone aggregate 430 reaches a desired temperature. Packages of a composition of pellets for tacky, deformable material and fine material measured to a proper amount to be used with stone aggregate 430 are used to manufacture the appropriate hot mix. The heated stone aggregate 430 mixes with the composition of pellets and fine material and melts the pellets through the rotation of drum 404 at least until the stone aggregate 430 is coated with the mixture of the melted tacky, deformable material and fine material.

Referring to FIG. 14B, at this point rotating drum 404 has mixed the components into hot mix 440 and burner 422 has been removed. Preferably, the burner 422 can be removed before insertion of the composition. Drum 404 can then be tilted by tilting lift 408 to disperse hot mix 440 out of opening 404A to the desired location in close proximity. In this manner, a hot mix that is easily workable can be easily dispenser that the location of its intended use.

Figure 15:
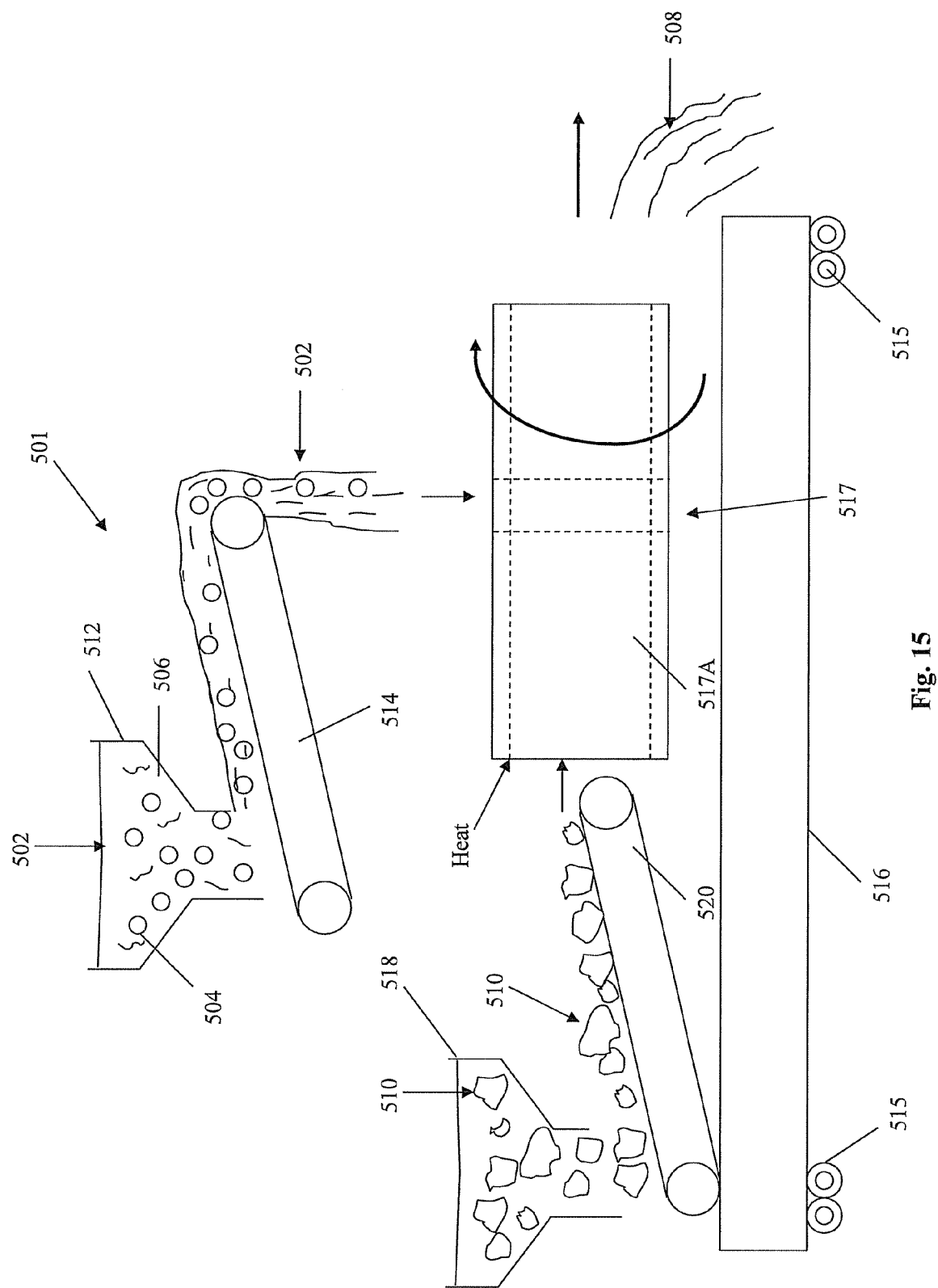
FIG. 15 illustrates a schematic view of a continuous process for making an asphaltic mixture according to the present subject matter.

FIG. 15 illustrates a schematic of a continuous process of manufacturing hot mix asphalt ("HMA") or a SMA asphalt as described above. The continuous process, generally designated as 501, includes placing a composition, generally designated as 502, of asphalt pellets 504 and fine powder 506 used in making an asphalt mixture 508 in with stone aggregate 510. The composition 502 and the stone aggregate 510 are placed into a mobile mixing unit 516 have wheels 515 to move mobile mixing chamber 516 to desired locations for mixing and dispersing the asphalt mixture 508.

Composition 502 is fed from a hopper 512 onto a conveyor 514, which transports composition 502 to an asphalt drum mixing chamber 517 of mobile mixing unit 516. Stone aggregate 510 is fed into a hopper 518 and onto a conveyor 520. Conveyor 520 transports stone aggregate 510 into a front portion 517A of an asphalt drum mixing chamber 517 of mobile mixing unit 516. At least the front portion 517A of the drum mixing chamber 517 is heated to heat stone aggregate 510 to a desired temperature.

As the composition 502 of asphalt pellets 504 and powder 506 are mixed with stone aggregate 510 within drum mixing chamber 517, asphalt mixture 508 is created. The heat within drum mixing chamber 517 and the heat now stored in stone aggregate 510 liquefies pellets 504 which then mix with fine powder 506 and stone aggregate 510 to make asphalt mixture 508. The process shown in FIG. 15 is continuous in that stone aggregate can be continuously fed into its hopper and the composition can be continuously fed into its hopper until the desired amount of hot mix is manufactured.

TEST EXAMPLES

A lab analysis of this process was performed at the University of New Hampshire (UNH) located in Durham, N.H. The methods of the composition of pellets and fine materials described above were compared with a conventional method using liquid binder added as a standard lab procedure with identical gradations, mixing, etc. Average strength tests were performed with the composition method vs. conventional mix. Table II shows typical gradations for uses in Airfields.

Another series of tests performed on a similar gradation mix design using the same rotating bucket mixer procedure as performed at the University of New Hampshire (UNH) was performed by the National Center for Asphalt Technology (NCAT) at Auburn, Ala. to compare the two step pellet procedure to the conventional liquid binder in a standard test. Results of the comparisons were indicated in a standard APA rut test where a specific cyclic load was applied to standard test specimens for degree of deformations.

TABLE II

Typical Mix Design Gradation For Air Fields

| Sieve Opening mm | % Aggregate Passing Sieve Opening |
|---|---|
| 25 | 100.0 |
| 19 | 99.6 |
| 12.5 | 91.5 |
| 9.5 | 79.7 |
| 4.75 | 58.2 |
| 2.36 | 44.8 |
| 1.18 | 33.3 |
| 0.6 | 22.0 |
| 0.3 | 12.6 |
| 0.15 | 6.3 |
| 0.075 | 3.3 |

Asphalt content: 5.3% by weight

Example 1

A gradation of 3546 grams of aggregate as shown in Table III was heated in an oven to 415° F. and placed in a rotating 5 gallon metal bucket. A mixture of 954 grams of fines and asphalt pellets composed of 238.5 grams of coated asphalt pellets and 715.5 grams of fine material gradation shown in Table IV was added to the 3546 grams of heated aggregate and mixed in the rotating drum for 2.5 minutes to form an HMA with a mix design suitable for air field runways.

TABLE III

Coarse Gradation Used In Example 1

| Sieve Opening mm | % Aggregate Passing Sieve Opening |
|---|---|
| 25 | 100.0 |
| 19 | 99.6 |
| 12.5 | 91.5 |
| 9.5 | 79.7 |
| 4.75 | 58.2 |
| 2.36 | 44.8 |
| 1.18 | 33.3 |
| 0.6 | 6.1 |

That mix was then removed and put into a SERVOPAC Gyratory Compactor where it was compacted for 75 cycles at a 1.5 degree inclination in a standard test. That sample was then removed and the air voids content was measured. This test was repeated on 3 different conditions of 3 samples each with the results shown in Table V. Two of the samples were made with different aggregate preheat temperatures and a third sample had ASPHA-MIN manufactured by Eurovia Services, GmbH, in Bottrop, Germany, which is a synthetic sodium aluminum silicate, added to the fine material/pellet mix to lower the viscosity during mixing as part of the warm mix technology.

TABLE IV

Fine Gradation for Pellets/Fine Mixture Used In Example 1

| Sieve Opening mm | % Aggregate Passing Sieve Opening |
|---|---|
| 0.6 | 15.9 |
| 0.3 | 12.6 |
| 0.15 | 6.3 |
| 0.075 | 3.3 |

Asphalt pellet content by weight of fines: 25%

This pellet method was compared with a conventional method using liquid binder added as a standard lab procedure with identical gradations, mixing, etc. Average strength tests were performed with the pellets vs. conventional mix with the average strength of the pellet mix measured as 5958 KPS vs. 5154 average for the conventional mix. The pellet mix strength was 15.6% higher.

Another series of tests performed on a similar gradation mix design using the same rotating bucket mixer procedure as performed at the University of New Hampshire (UNH) was performed by the National Center for Asphalt Technology (NCAT) at Auburn, Ala. to compare the two step pellet procedure to the conventional liquid binder in a standard test. Results of the comparisons were indicated in a standard APA rut test where a specific cyclic load was applied to standard test specimens for degree of deformations. Results indicated the pelletized material performed better than the standard material with a deformation of 2.59 mm for the pellets vs. 2.97@ for the standard. The pellets indicated 12.8% less deformation to rutting for a dense grade HMA airfield design.

TABLE V

Air Voids from Gyratory Compactor For Different Conditions

| Description of Test Condition | % Air Voids Average 3 Samples |
|---|---|
| Preheat Aggregate (coarse) to 415° F. | 6.0 |
| Preheat Aggregate (coarse) to 380° F. | 6.6 |
| Preheat Aggregate (coarse) to 380° F. + addition of ASPHA-MIN at a ratio of 8 lbs/mix ton for warm mix effect | 5.8 |

Example 2

50 pound bags of aggregate consisting of 35 pounds of ⅜ inch stone and 15 pounds of coarse sand mixed together were prepared. Also, small plastic bags of composition were prepared weighing 10 pounds. The composition was composed of 3.6 pounds of pellets mixed with 6.4 pounds of aggregate passing #30 sieve and the pellets and fine material were thoroughly mixed together.

One 50 pound bag of aggregate was placed in a 2.5 cubic ft. rotary cement mixer purchased from Home Depot. The mixer was turned on and the stone aggregate heated to 360° F. by using a high capacity Maine Oxy 500,000 BTU/hr propane torch. This heating occurred in 2 minutes. The stone aggregate temperature was measured using an EXTECH 42529 IR non-content thermometer.

The heater was turned off and the 10 pound bag of pellets and fines was introduced into the rotating mixer. The pellets dispersed well. After continued mixing within 2 minutes, the pellets softened and coated the aggregate well producing a good quality hot mix at a temperature of about 320° F. That material was then placed in a wooden form and compacted, producing a two inch thick asphaltic slab.

Example 3

In Example 3, the procedure from Example 1 was repeated using 2 bags of 50 pounds of stone aggregate each and heated to about 360° F. in 5 minutes. The heat was turned off and 2 bags of 10 pounds each of the composition described above were added. The mixer continued 3 minutes, and 120 pounds of quality hot mix was produced and dumped from the mixer.

Embodiments of the present disclosure shown in the drawings and described above are exemplary of numerous embodiments that can be made within the scope of the appending claims. It is contemplated that the configurations of the compositions of fine material and tacky, deformable material and methods of manufacturing hot mix on site utilizing the compositions can comprise numerous configurations other than those specifically disclosed. The scope of a patent issuing from this disclosure will be defined by these appending claims.

What is claimed is:

1. A method of making hot mix at a location of use, the method comprising:
   moving a mixing chamber within proximity of the location where the hot mix is to be used;
   providing a composition of discrete substances that are capable of being mixed together to form a composite material upon proper heating, the composition including a plurality of pellets of a tacky, deformable material dispersed within a flowable fine material in a manner that minimizes pellet to pellet contact;
   providing a stone aggregate based on a gradation to be used in the hot mix;
   placing the stone aggregate in the mixing chamber;
   heating at least a portion of the stone aggregate in the mixing chamber to a temperature sufficient to soften the pellets of the tacky, deformable material;
   adding the composition of discrete substances into the mixing chamber;
   agitating the mixture of the composition of discrete substances and the stone aggregate until the pellets of the tacky, deformable material soften and coat the stone aggregate.

2. A method as in claim 1, wherein the tacky, deformable material comprises about 6% by weight of the total mix.

3. A method as in claim 1, wherein the tacky, deformable material comprises an asphaltic material.

4. A method as in claim 1, wherein the tacky, deformable material comprises a polymer.

5. A method as in claim 4, wherein polymer comprises a clear polymer.

6. A method as in claim 5, wherein the clear polymer will diffuse light from a light source.

7. A method as in claim 6, wherein the polymer is at least one of an acrylic or polycarbonate.

8. A method as in claim 5, wherein the aggregate is colored for a specific use.

9. A method as in claim 5, wherein the polymer crosslinks upon heating producing a non thermoplastic material.

10. A method as in claim 9, wherein the polymer includes a one or two part epoxy powder.

11. A method as in claim 1, wherein the tacky, deformable material includes an additive which will emit light previously absorbed from the sun.

12. A method as in claim 1, wherein the tacky, deformable material will emit light when powered by an external energy source.

13. A method as in claim 1, wherein the pellets of the tacky, deformable material comprise micropellets with a diameter less than 1 mm.

14. A method as in claim 1, wherein the tacky, deformable material is extracted from oil sand.

15. A method as in claim 1, wherein the heat source for the stone aggregate is an open flame directly contacting the stone aggregate.

16. A method as in claim 1, wherein the aggregate is heated on site with solar energy focused to create the 300° F. to 450° F. temperature required for the aggregate.

17. A method as in claim 1, further comprising discharging the hot mix directly into a forming device.

18. A method as in claim 17, further comprising extruding shapes such as curbs, edges, and walkways on demand at the location of use using the forming device.

19. A method as in claim 1, wherein pellets of a tacky, deformable material are coated.

20. A method as in claim 1, wherein the method of manufacturing is continuous.

21. A method of making hot mix at a location of use, the method comprising:
   moving a mixing chamber within proximity of the location where the hot mix is to be used;
   providing a composition of discrete substances that are capable of being mixed together to form a composite material upon proper heating, the composition including a plurality of pellets of a tacky, deformable material dispersed within a flowable fine material such that the fine material occupies the interstices between the plurality of pellets in a manner that minimizes pellet to pellet contact;
   providing a stone aggregate based on a gradation to be used in the hot mix;
   placing the stone aggregate in the mixing chamber;
   heating at least a portion of the stone aggregate in the mixing chamber to a temperature sufficient to soften the pellets of the tacky, deformable material;
   adding the composition of discrete substances into the mixing chamber;
   agitating the mixture of the composition of discrete substances and the stone aggregate until the pellets of the tacky, deformable material soften and coat the stone aggregate.

22. A method as in claim 21, wherein the tacky, deformable material comprises about 6% by weight of the total mix.

23. A method as in claim 21, wherein the tacky, deformable material comprises an asphaltic material.

24. A method as in claim 21, wherein the tacky, deformable material comprises a polymer.

25. A method as in claim 21, wherein the heat source for the stone aggregate is an open flame directly contacting the stone aggregate.

26. A method as in claim 21, further comprising discharging the hot mix directly into a forming device.

27. A method as in claim 26, further comprising extruding shapes such as curbs, edges, and walkways on demand at the location of use using the forming device.

28. A method as in claim 21, wherein pellets of a tacky, deformable material are coated.

29. A method as in claim 21, wherein the method of manufacturing is continuous.

* * * * *